US005623315A

United States Patent [19]

Takahashi et al.

[11] Patent Number: 5,623,315

[45] Date of Patent: Apr. 22, 1997

[54] COMPUTER SYSTEM FOR PROCESSING SOUND DATA

[75] Inventors: Katsunori Takahashi; Masahide Tomita, both of Hokkaido, Japan

[73] Assignee: Hudson Soft Co., Ltd., Hokkaido, Japan

[21] Appl. No.: 549,297

[22] Filed: Oct. 27, 1995

Related U.S. Application Data

[62] Division of Ser. No. 128,288, Sep. 29, 1993.

[30] Foreign Application Priority Data

| | | | |
|---|---|---|---|
| Sep. 30, 1992 | [JP] | Japan | 4-285154 |
| Oct. 1, 1992 | [JP] | Japan | 4-284981 |
| Oct. 2, 1992 | [JP] | Japan | 4-289634 |
| Oct. 2, 1992 | [JP] | Japan | 4-289635 |
| Oct. 7, 1992 | [JP] | Japan | 4-293769 |
| Oct. 9, 1992 | [JP] | Japan | 4-298070 |

[51] Int. Cl.[6] .......... H04N 9/475

[52] U.S. Cl. .......... 348/515; 348/512

[58] Field of Search .......... 395/550, 162, 395/164, 700; 348/512, 480, 481, 482, 483, 484, 485, 552, 738, 14, 17, 515, 423; 345/153, 94, 122; H04N 9/475

[56] References Cited

U.S. PATENT DOCUMENTS

| | | | |
|---|---|---|---|
| 4,862,150 | 8/1989 | Katsura et al. | 340/703 |
| 4,864,289 | 9/1989 | Nishi et al. | 340/725 |
| 5,091,723 | 2/1992 | Kanno et al. | 340/784 |
| 5,095,301 | 3/1992 | Guttag et al. | 340/703 |
| 5,336,844 | 8/1994 | Yamauchi et al. | 84/602 |
| 5,459,485 | 10/1995 | Yomita et al. | 345/150 |
| 5,467,442 | 11/1995 | Tsubota et al. | 395/135 |
| 5,479,604 | 12/1995 | Tsubota | 395/162 |

FOREIGN PATENT DOCUMENTS

| | | |
|---|---|---|
| 206328 | 12/1986 | European Pat. Off. . |
| 328356 | 8/1989 | European Pat. Off. . |
| 524468 | 1/1991 | European Pat. Off. . |
| 437630 | 7/1991 | European Pat. Off. . |
| 465102 | 1/1992 | European Pat. Off. . |
| 2137857 | 4/1984 | United Kingdom . |
| 2210239 | 8/1988 | United Kingdom . |
| 2247814 | 10/1991 | United Kingdom . |

*Primary Examiner*—Michael Lee

*Attorney, Agent, or Firm*—Lowe, Price, LeBlanc & Becker

[57] ABSTRACT

Sound data are transmitted to an ADPCM decoder in synchronization with a horizontal synchronizing signal, according to which image data are transmitted.

1 Claim, 26 Drawing Sheets

110 SOUND DATA OUTPUT UNIT

| SAMPLING RATE FREQUENCY | (PER CHANNEL) TRANSFER CYCLE | DATA TRANSFER FORM | AMOUNT TO BE ADDED (ONE STEP) |
|---|---|---|---|
| 31.47 KHz | 2 H | 8 bit x 2 (4 x 4) | ———— |
| 15.73 KHz | 4 H | 8 bit x 2 (4 x 4) | ( d(n)-d(n-1) ) / 2 |
| 7.87 KHz | 8 H | 8 bit x 2 (4 x 4) | ( d(n)-d(n-1) ) / 2 |
| 3.93 KHz | 16 H | 8 bit x 2 (4 x 4) | ( d(n)-d(n-1) ) / 2 |

FIG. 9

| ADPCM DATA (NO-CODE) | VARIATION | LEVEL CHANGING VALUE |
|---|---|---|
| 0 0 0 | 1 | − 1 |
| 0 0 1 | 2 | − 1 |
| 0 1 0 | 3 | − 1 |
| 0 1 1 | 4 | − 1 |
| 1 0 0 | 5 | + 2 |
| 1 0 1 | 6 | + 4 |
| 1 1 0 | 7 | + 6 |
| 1 1 1 | 8 | + 8 |

FIG. 10

| SCALE LEVEL | SCALE VALUE | SCALE LEVEL | SCALE VALUE | SCALE LEVEL | SCALE VALUE |
|---|---|---|---|---|---|
| 0 | 16 | 17 | 80 | 34 | 408 |
| 1 | 17 | 18 | 88 | 35 | 449 |
| 2 | 19 | 19 | 97 | 36 | 494 |
| 3 | 21 | 20 | 107 | 37 | 544 |
| 4 | 23 | 21 | 118 | 38 | 598 |
| 5 | 25 | 22 | 130 | 39 | 658 |
| 6 | 28 | 23 | 143 | 40 | 724 |
| 7 | 31 | 24 | 157 | 41 | 796 |
| 8 | 34 | 25 | 173 | 42 | 876 |
| 9 | 37 | 26 | 190 | 43 | 963 |
| 10 | 41 | 27 | 209 | 44 | 1060 |
| 11 | 45 | 28 | 230 | 45 | 1166 |
| 12 | 50 | 29 | 253 | 46 | 1282 |
| 13 | 55 | 30 | 279 | 47 | 1411 |
| 14 | 60 | 31 | 307 | 48 | 1552 |
| 15 | 66 | 32 | 337 | | |
| 16 | 73 | 33 | 371 | | |

FIG. 11

| D7 | D6 | D5 | D4 | D3 | D2 | D1 | D0 |
|---|---|---|---|---|---|---|---|
| UNUSED | | RST ADPCM #2 | RST ADPCM #1 | INTER-POLATION #2 | INTER-POLATION #1 | D1V1 | D1V1 |

FIG. 12

| D7 | D6 | D5 | D4 | D3 | D2 | D1 | D0 |
|---|---|---|---|---|---|---|---|
| UNUSED | | ADPCM #1 VOL L5 | ADPCM #1 VOL L4 | ADPCM #1 VOL L3 | ADPCM #1 VOL L2 | ADPCM #1 VOL L1 | ADPCM #1 VOL L0 |
| UNUSED | | ADPCM #1 VOL R5 | ADPCM #1 VOL R4 | ADPCM #1 VOL R3 | ADPCM #1 VOL R2 | ADPCM #1 VOL R1 | ADPCM #1 VOL R0 |
| UNUSED | | ADPCM #2 VOL L5 | ADPCM #2 VOL L4 | ADPCM #2 VOL L3 | ADPCM #2 VOL L2 | ADPCM #2 VOL L1 | ADPCM #2 VOL L0 |
| UNUSED | | ADPCM #2 VOL R5 | ADPCM #2 VOL R4 | ADPCM #2 VOL R3 | ADPCM #2 VOL R2 | ADPCM #2 VOL R1 | ADPCM #2 VOL R0 |

FIG. 14

ADPCM DECODER CONTROL REGISTERS (1), (2)

| | 7 | 6 | 5 | 4 | 3 | 2 | 1 | 0 |
|---|---|---|---|---|---|---|---|---|
| (1) | | | | | DIV1 | DIV0 | READ EN#2 | READ EN#1 |
| (2) | | | | | | BUF HALF#1 | BUF END#1 | RING BUF#1 |
| (2) | | | | | | BUF HALF#2 | BUF END#2 | RING BUF#2 |

(3)

| 9 | 8 | 7 | 6 | 5 | 4 | 3 | 2 | 1 | 0 | |
|---|---|---|---|---|---|---|---|---|---|---|
| -A/B | KA16 | KA15 | KA14 | KA13 | KA12 | KA11 | KA10 | KA9 | KA8 | #1 |
| -A/B | KA16 | KA15 | KA14 | KA13 | KA12 | KA11 | KA10 | KA9 | KA8 | #2 |

KA0−KA7=OOH FIXED (4)

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| -A/B | KA16 | KA15 | KA14 | KA13 | KA12 | KA11 | KA10 | KA9 | KA8 | KA7 | KA6 | KA5 | KA4 | KA3 | KA2 | KA1 | KA0 |
| -A/B | KA16 | KA15 | KA14 | KA13 | KA12 | KA11 | KA10 | KA9 | KA8 | KA7 | KA6 | KA5 | KA4 | KA3 | KA2 | KA1 | KA0 |

UPPER #1, LOWER #2

(5)

| 11 | 10 | 9 | 8 | 7 | 6 | 5 | 4 | 3 | 2 | 1 | 0 | |
|---|---|---|---|---|---|---|---|---|---|---|---|---|
| -A/B | KA16 | KA15 | KA14 | KA13 | KA12 | KA11 | KA10 | KA9 | KA8 | KA7 | KA6 | #1 |
| -A/B | KA16 | KA15 | KA14 | KA13 | KA12 | KA11 | KA10 | KA9 | KA8 | KA7 | KA6 | #2 |

KA0−KA5=00H FIXED (6)

| 7 | 6 | 5 | 4 | 3 | 2 | 1 | 0 |
|---|---|---|---|---|---|---|---|
| | | | | SOUND HALF#2 | SOUND END #2 | SOUND HALF#1 | SOUND END #1 |

FIG. 17

| REGISTER ADDRESS | | D7 | D6 | D5 | D4 | D3 | D2 | D1 | D0 |
|---|---|---|---|---|---|---|---|---|---|
| R00 (00)H | PSG CHANNEL SELECTION | | | | | | ch SEL | | |
| R01 (01)H | PSG MAIN VOLUME ADJUST | LMAL | | | | RMAL | | | |
| R02 (02)H | FREQUENCY FINE ADJ | FRQ LOW | | | | | | | |
| R03 (03)H | FREQUENCY FINE ADJ | | | | | FRQ HIGH | | | |
| R04 (04)H | CHANEL ON DDA CHAN-VOLUME | ch ON | DDA | | A L | | | | |
| R05 (05)H | L.R VOLUME | LAL | | | | RAL | | | |
| R06 (06)H | WAVE FORM | | | | WAVE DATA | | | | |
| R07 (07)H | NOISE ENABLE NOISE FREQ | NE | | | NOISE FRQ | | | | |
| R08 (08)H | LFO FREQUENCY | LFO FRQ | | | | | | | |
| R09 (09)H | LFO CONTROL | LF TRG | | | | | | LF CTL | |

FIG. 18

| D7 | D6 | D5 | D4 | D3 | D2 | D1 | D0 |
|---|---|---|---|---|---|---|---|
| NOT USED | | PCM VOL L5 | PCM VOL L4 | PCM VOL L3 | PCM VOL L2 | PCM VOL L1 | PCM VOL L0 |
| NOT USED | | PCM VOL R5 | PCM VOL R4 | PCM VOL R3 | PCM VOL R2 | PCM VOL R1 | PCM VOL R0 |

FIG. 19

| REG | AMP STEP | ATTEN STEP | SPEED (μS) | REG | AMP STEP | ATTEN STEP | SPEED (μS) |
|---|---|---|---|---|---|---|---|
| 00 | 0 | 0 | 2956.16 | 20 | 527 | 512 | 1.49 |
| 01 | 31 | 16 | 47.68 | 21 | 543 | 528 | 〃 |
| 02 | 47 | 32 | 23.84 | 22 | 559 | 544 | 〃 |
| 03 | 63 | 48 | 〃 | 23 | 575 | 560 | 〃 |
| 04 | 79 | 64 | 11.92 | 24 | 591 | 576 | 〃 |
| 05 | 95 | 80 | 〃 | 25 | 607 | 592 | 〃 |
| 06 | 111 | 96 | 〃 | 26 | 623 | 608 | 〃 |
| 07 | 127 | 112 | 〃 | 27 | 639 | 624 | 〃 |
| 08 | 143 | 128 | 5.96 | 28 | 655 | 640 | 〃 |
| 09 | 159 | 144 | 〃 | 29 | 671 | 656 | 〃 |
| 0A | 175 | 160 | 〃 | 2A | 687 | 672 | 〃 |
| 0B | 191 | 176 | 〃 | 2B | 703 | 688 | 〃 |
| 0C | 207 | 192 | 〃 | 2C | 719 | 704 | 〃 |
| 0D | 223 | 208 | 〃 | 2D | 735 | 720 | 〃 |
| 0E | 239 | 224 | 〃 | 2E | 751 | 736 | 〃 |
| 0F | 255 | 240 | 〃 | 2F | 767 | 752 | 〃 |
| 10 | 271 | 256 | 2.98 | 30 | 783 | 768 | 〃 |
| 11 | 287 | 272 | 〃 | 31 | 799 | 784 | 〃 |
| 12 | 303 | 288 | 〃 | 32 | 815 | 800 | 〃 |
| 13 | 319 | 304 | 〃 | 33 | 831 | 816 | 〃 |
| 14 | 335 | 320 | 〃 | 34 | 847 | 832 | 〃 |
| 15 | 351 | 336 | 〃 | 35 | 863 | 848 | 〃 |
| 16 | 367 | 352 | 〃 | 36 | 879 | 864 | 〃 |
| 17 | 383 | 368 | 〃 | 37 | 895 | 880 | 〃 |
| 18 | 399 | 384 | 〃 | 38 | 911 | 896 | 〃 |
| 19 | 415 | 400 | 〃 | 39 | 927 | 912 | 〃 |
| 1A | 431 | 416 | 〃 | 3A | 943 | 928 | 〃 |
| 1B | 447 | 432 | 〃 | 3B | 959 | 944 | 〃 |
| 1C | 463 | 448 | 〃 | 3C | 975 | 960 | 〃 |
| 1D | 479 | 464 | 〃 | 3D | 991 | 976 | 〃 |
| 1E | 495 | 480 | 〃 | 3E | 1007 | 992 | 〃 |
| 1F | 511 | 496 | 〃 | 3F | 1023 | 1023 | 〃 |

_HSYNC

_WRR

DATA

SOUND REPRODUCING

OUTPUT
JUDGEMENT OF LEVEL HOLD
1
2
3
4
5
6
7
8
9
n
n+1
n+2
n+3
REPRODUCE DATA n
REPRODUCE DATA n+1
REPRODUCE DATA n+2
CHECK n
CHECK n+1
CHECK n+2
CHECK n+3
OUTPUT LEVEL HOLD
(Holding the last 4 bits of data n+1)
TRANSFER CYCLE (Checking the following data)

_HSYNC

_WRR

SD7~SD0
UPPER 1 byte
LOWER 1 byte

FIG. 22

| SAMPLING FREQUENCY | TRANSFER CYCLE | DATA TRANSFER FROM (RER CHANNEL) | REFERENCE FOR TRANSFER STOP |
|---|---|---|---|
| 31.47KHz | 2H | 8BIT×2 (4×4) | NO TRANSFER THROUGH 2H PERIOD |
| 15.73KHz | 4H | 8BIT×2 (4×4) | NO TRANSFER THROUGH 4H PERIOD |
| 7.87KHz | 8H | 8BIT×2 (4×4) | NO TRANSFER THROUGH 8H PERIOD |
| 3.93KHz | 16H | 8BIT×2 (4×4) | NO TRANSFER THROUGH 16H PERIOD |

FIG. 28

SOUND CONTROL REGISTER

| 7 | 6 | 5 | 4 | 3 | 2 | 1 | 0 |
|---|---|---|---|---|---|---|---|
|   |   |   |   | DIV1 | DIV1 | READ EN#2 | READ EN#1 |

SOUND BUFFER CONTROL REGISTER #1

| 7 | 6 | 5 | 4 | 3 | 2 | 1 | 0 |
|---|---|---|---|---|---|---|---|
|   |   |   |   |   | BUF HALF#1 | BUF END#1 | RING BUF#1 |

SOUND START ADDRESS #1 REGISTER

| 9 | 8 | 7 | 6 | 5 | 4 | 3 | 2 | 1 | 0 |
|---|---|---|---|---|---|---|---|---|---|
| -A/B | KA16 | KA15 | KA14 | KA13 | KA12 | KA11 | KA10 | KA9 | KA8 |

KA0–KA7 = 00H FIXED

SOUND END ADDRESS #1 REGISTER

| 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|---|---|---|---|---|---|---|---|---|---|
| -A/B | KA16 | KA15 | KA14 | KA13 | KA12 | KA11 | KA10 | KA9 | KA8 | KA7 | KA6 | KA5 | KA4 | KA3 | KA2 | KA1 | KA0 |

COMPUTER SYSTEM FOR PROCESSING SOUND DATA

This application is a division of application Ser. No. 08/128,288 filed Sep. 29, 1993.

BACKGROUND OF THE INVENTION

The present invention relates to a computer system, and more particularly to a game computer system dealing with both sound and image data.

Traditionally, in a computer system, sound is produced from waveform data, which is generated by a computer program based process; however, the quality of the sound has been low. For that reason, sound data (analog signals) now are converted into digital signals so that the sound waves may be synthesized by an arithmetic operation.

In general, a game computer system uses a programmable sound generator (PSG), which is small in size and capacity. In the PSG, wave data supplied by a CPU are modulated in amplitude or frequency in order to generate a sound wave. The PSG may generate simple waves to intentionally produce noise. According to the PSG, it is easy to control the output sound; however, it is difficult to generate a variety of sounds.

In order to realize A/D conversion, a pulse code modulation (PCM) method is used, by which an analog signal is sampled at predetermined intervals, the sampled data are quantized, and then, are transformed into binary data.

In another way, a difference PCM (DPCM) method, the difference of the next two sampled data is quantized so that the amount of output data to be transmitted is reduced. Further, according to an adaptive difference PCM (ADPCM) method, the quantizing process is performed at a short pitch when the next two sampled data have a great difference, and on the other hand, the process is performed at a long pitch when they have a small difference. As a result, the output data may be more compressed.

The PCM and ADPCM data are compatible with each other by compression and extension processing, the processing being performed based on two kinds of conversion between scale value and scale level, and among the ADPCM data, the changing amount and changing level of the data.

In a game computer, ADPCM sound data stored in an extra recording device are read by a CPU, and the data are extended by an ADPCM decoder in accordance with scale value and scale level to reproduce the original sound. The ADPCM decoder contains a synchronizing signal generating circuit, which generates a transmission rate, according to which the PCM data are reproduced, by using a crystal resonator.

Recently, a game computer has not only sound sources such as PSG and ADPCM controlled by the CPU, but also an external audio device to realize high quality sound reproduction. For example, in a game computer using a CD (compact disk) as a recording medium, a CD player is directly used as the PCM sound source.

In such a game computer system, it is desirable to reproduce sound data in synchronization with each other to display image data. In a conventional system, the sound data are reproduced in synchronization with their own synchronizing signal generated in the ADPCM decoder, and the image data are displayed in synchronization with vertical synchronizing signals.

The CPU controls the outputs of the sound and image data to be synchronized in accordance with the sound synchronizing signal and vertical synchronizing signal. For example, sound is reproduced in synchronization with an image for each data set, that is, the image starts to be displayed when the first data of the sound data set start being reproduced. However, a time gap of outputs between the sound and image data grows gradually with progression to the end of the sound data set.

The CPU resets the ADPCM decoder to initialize the scale level and PCM value. If the ADPCM data are not transmitted accidentally or some tables occur in the transmission, the scale level and PCM value may go out of order. As a result, it becomes difficult to reproduce the sound normally, unless the ADPCM data are reset to start reproducing again. Even if the ADPCM data are reset, sound data may not be reproduced in the middle, that is, the sound data must be reproduced again from the start.

As another way, the ADPCM data are checked whether they are transmitted normally, and when some tables occur in the transmission, operation for reading ADPCM data is repeated until normal data may be read. According to this processing, which is called a "retry function," however, it takes long time to restore to the normal condition.

Generally, image data occupy an area larger than that of sound data in a memory. A variety of sound sources are used in order to realize high quality sound reproduction with a small amount of data. When a CD is employed as a sound storage medium, the PSG, ADPCM or PCM decoder is used as a sound source. The PSG decoder reproduces waveform sound, effect sound and the like. The ADPCM decoder reproduces complicated natural sound, human voice and the like. The PCM decoder reproduces sound that is not necessary to be controlled in timing. According to the ADPCM decoder, it is difficult to realize high quality sound reproduction.

In the ADPCM decoder, ADPCM data are calculated by omitting the figures after the decimal point in order to reproduce the original sound. This omission causes an error in the scale level and PCM value, which are used in the reproducing process, and therefore, the original sound may not be reproduced normally. The reproducing error is accumulated when a large amount of ADPCM data are treated.

In the game computer system, it is required to change the sampling frequency (reproducing rate) as needed.

SUMMARY OF THE INVENTION

Accordingly, it is an object of the present invention to provide a computer system in which sound and image data may be supplied in exact synchronization with each other.

It is another object of the present invention to provide a computer system in which sound data may be well reproduced from the middle.

It is another object of the present invention to provide a computer system by which high quality sound reproduction may be realized.

It is still another object of the present invention to provide a computer system in which a reproducing rate (sampling frequency) of ADPCM data may be changed easily.

According to a first feature of the present invention, sound data are transmitted to an ADPCM decoder in synchronization with a horizontal synchronizing signal, according to which image data are transmitted.

According to a second feature of the present invention, ADPCM (Adaptive Difference Pulse Code Modulation) sound data are provided with control data which are not used in normal condition. The control data are calculated in advance, and used for calculating a proper decoding coefficient of an ADPCM decoder. The ADPCM decoder uses the proper decoding coefficient to reproduce the sound from the middle after interruption.

According to a third feature of the present invention, an ADPCM decoder reproduces original sound from ADPCM sound data by arithmetic operation. The arithmetic operation is carried out using a rounding function.

According to a fourth feature of the present invention, an ADPCM decoder holds the previous ADPCM data until the following normal ADPCM data are transmitted thereto.

According to a fifth feature of the present invention, a controller synchronizes the operations of ADPCM generator and ADPCM decoder with each other. The same data are set in registers contained in the ADPCM generator and ADPCM decoder to specify a predetermined sampling frequency.

BRIEF DESCRIPTION OF THE DRAWINGS

FIG. 9 is a table showing a relation among the ADPCM data, variation values and level changing values, according to the invention.

FIG. 10 is a table showing a relation between scale levels and scale values, according to the invention.

FIG. 11 is a diagram showing the contents of an operation register according to the invention.

FIG. 12 is a table showing the contents of a volume control register according to the invention.

FIG. 14 is a diagram showing the contents of ADPCM decoder control registers according to the invention.

FIG. 17 is a diagram showing the contents of a PSG operation register according to the invention.

FIG. 18 is a diagram showing the contents of a volume control register for the PCM data, according to the invention.

FIG. 19 is a table showing interrelationships among register values, amplifier and attenuation steps, and adjusting speed, according to the invention.

FIG. 22 is a table showing level holding periods for each sampling frequency, according to the invention.

FIG. 28 is a diagram showing registers used for processing the sound data, according to the invention.

DETAILED DESCRIPTION OF THE INVENTION

Figure 1:
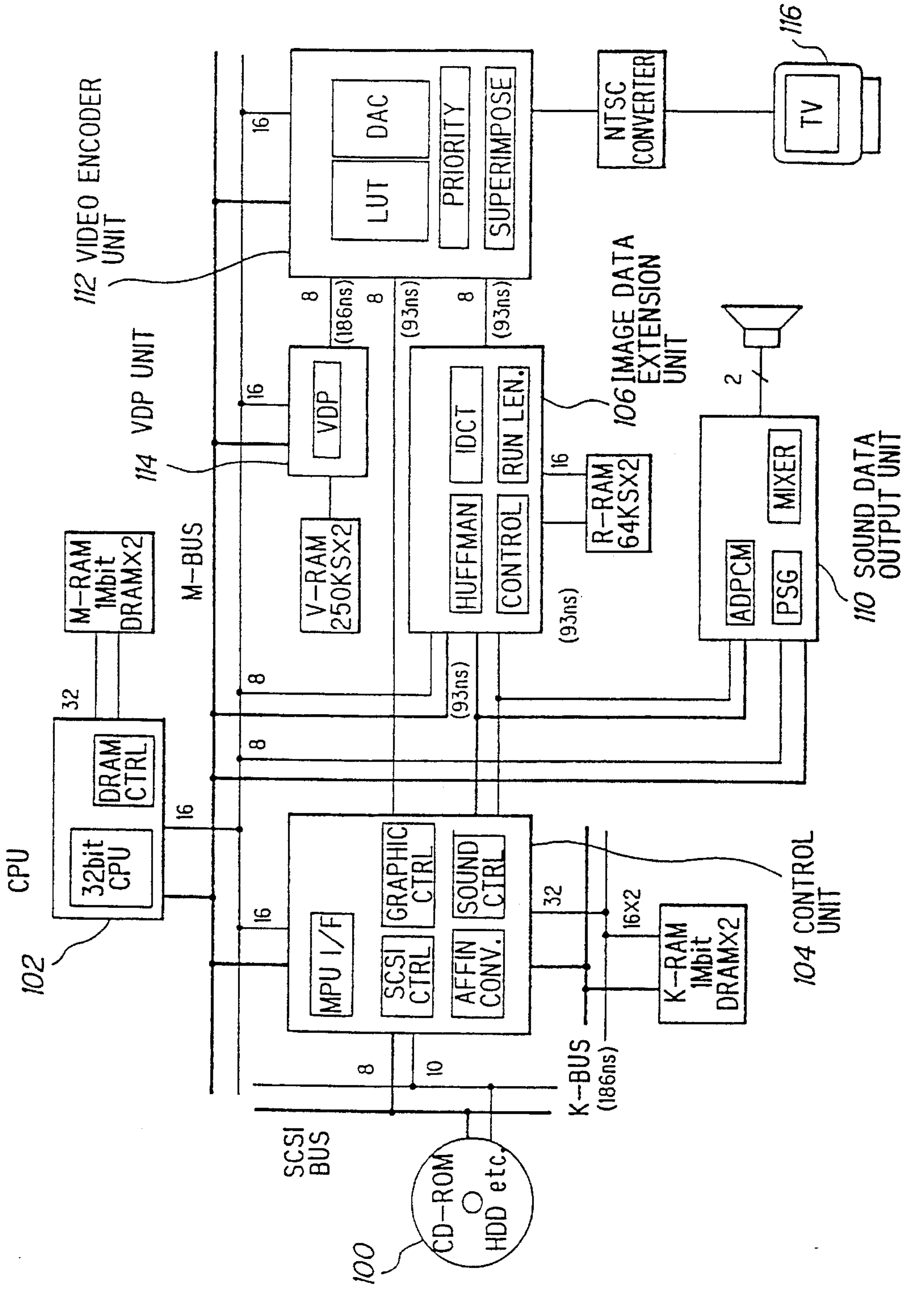
FIG. 1 is a block diagram showing a computer system according to the invention.

FIG. 1 shows a computer system, which includes a game-software recording medium 100 such as a CD-ROM, a CPU 102 of the 32-bit type, a control unit 104 for mainly controlling transmission of sound data and interfacing most devices to each other, an image data extension unit 106, an image data output unit, a sound data output unit 110, a video encoder unit 112, a VDP unit 114 and a TV display 116.

CPU 102, control unit 104, image data extension unit 106 and VDP unit 114 are provided with their own memories M-RAM, K-RAM, R-RAM and V-RAM, respectively.

In this system, sound data are transmitted from the CD-ROM to the sound data output unit by the functions of the CPU and control unit. Under control of the CPU, a sound controller (SOUNDCTL) of the control unit controls transmission of sound data to an ADPCM decoder of the sound data output unit. The SOUNDCTL also controls transmission of compressed image data in accordance with time-division multiplexing performed by a priority circuit. An SCSICTRL in the control unit controls data transmission from an external device through an SCSI interface to the K-RAM. The control unit has a microprogram function for processing image data, which are formed by superimposing background and sprite images, and for transmitting compressed image and sound data. In this system, the number of instructions that the CPU must process is decreased, because each unit has a large amount of memory and the control unit has the above mentioned function.

Figures 2A, 2B, 2C:
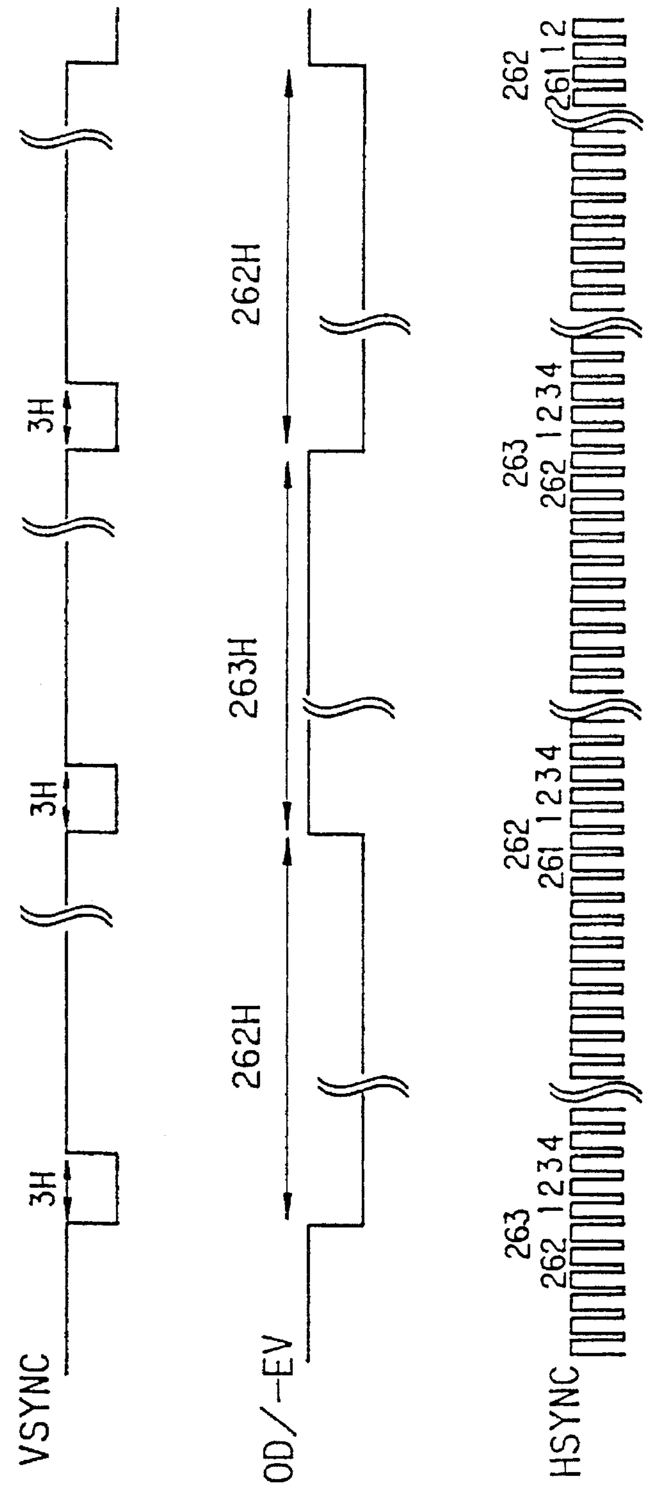
FIGS. 2(*a*)–(*c*) are a timing chart showing a relation between horizontal and vertical synchronizing signals.

In this computer system, 525 raster lines, which are composed of 263 odd fields and 262 even fields, are scanned in synchronization with a horizontal synchronizing signal (HSYNC) of 31.47 kHz, as shown in FIG. 2. An image is displayed in synchronization with a vertical synchronizing signal of 59.94 kHz field by field. In FIG. 2, "OD/-EV" represents which fields of odd or even are currently displayed.

In this computer system, the ADPCM data are transmitted and reproduced in accordance with horizontal synchronizing signals (15.735 kHz) and dot clocks (5 MHz), which are used for controlling a display cycle of image data for each dot.

Figure 3:
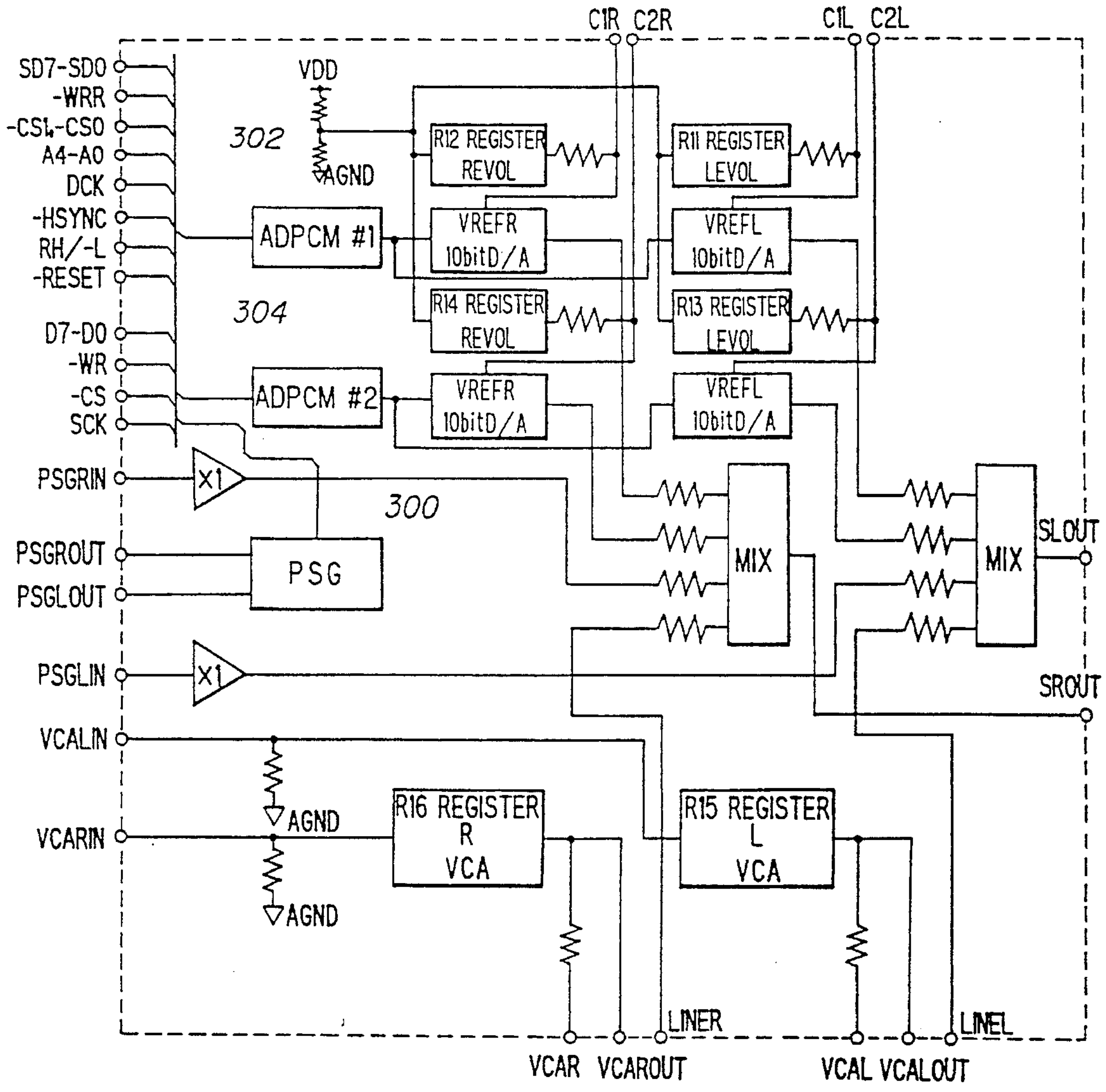
FIG. 3 is a block diagram illustrating a sound data output unit used in the computer system shown in FIG. 2.

FIG. 3 shows sound data output unit 110, shown in FIG. 1. The sound data output unit includes a 6 channel programmable sound generator (PSG) 300, right and left channels ADPCM decoders (#1 and #2) 302 and 304, a sound data output circuit to which sound data are supplied from the CD-ROM (external sound source), and a volume control circuit 306 for controlling output of the ADPCM decoder and PSG.

Sound data supplied from the ADPCM decoder are buffered in the K-RAM and are transmitted to the next stage by the control unit. The ADPCM sound data are defined by 4 bits, in which the first bit represents a code, and are transmitted to the next stage byte by byte.

Figure 4:
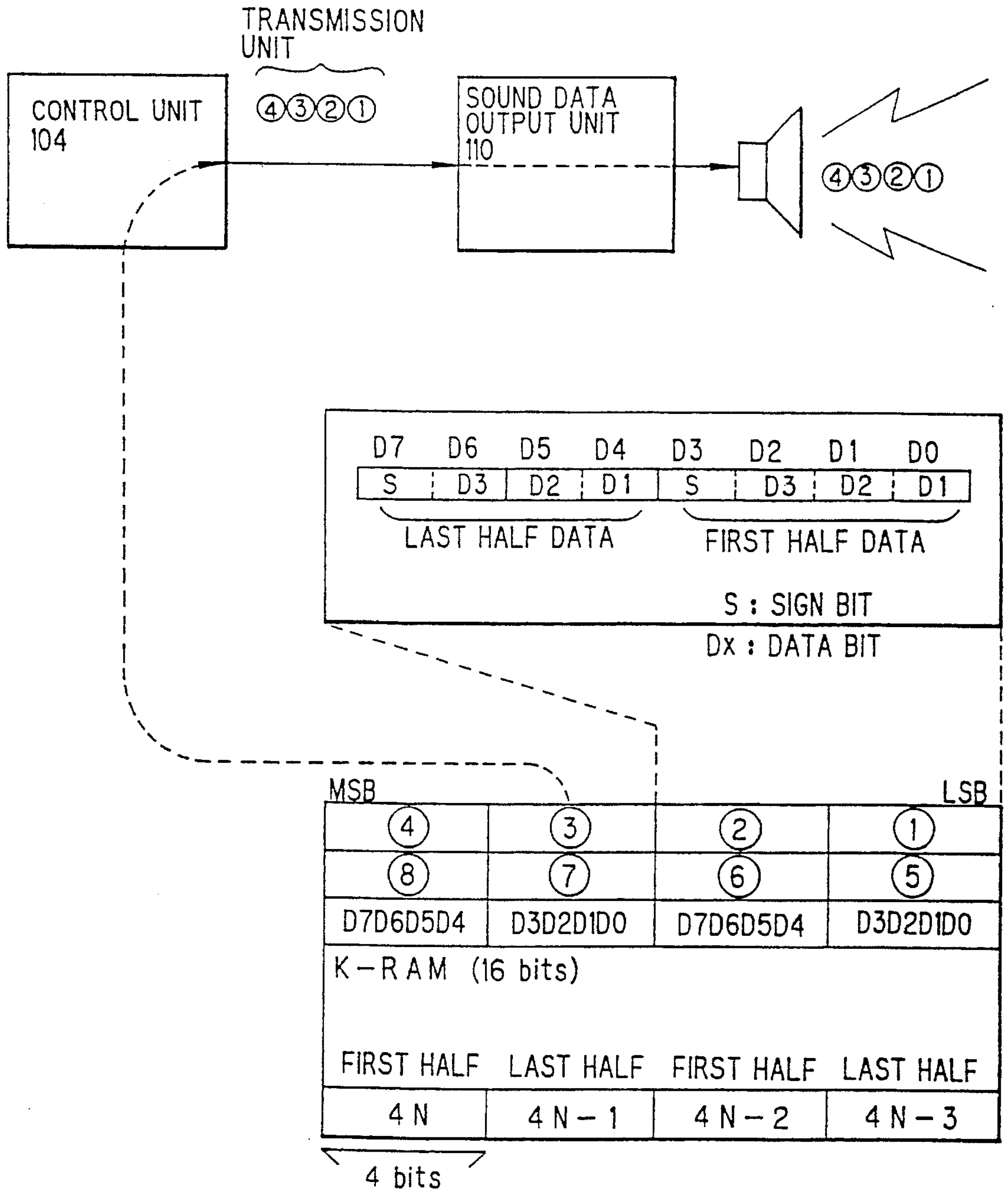
FIG. 4 is an explanatory diagram showing a storage configuration of ADPCM data in the memory, according to the invention.

FIG. 4 shows a memory configuration for the ADPCM data in the K-RAM, shown in FIG. 1. As shown in FIG. 4, sound data to be transmitted to the ADPCM decoder are stored by 16 bits boundary in the K-RAM, the sound data being composed of 4 bits including one symbol bit. The sound data are written, read and transmitted in the order of (1) to (8).

The sampling frequency of 31.47 kHz is generated in accordance with the synchronizing signal itself, and with a dot timing at the intermediate point of the cycle of the horizontal synchronizing signal (341.25 dots). Basically, the ADPCM decoder uses the sampling frequency of 31.47 kHz; however, 15,73 kHz, 7.87 kHz and 3.98 kHz are available.

Figures 5, 6:
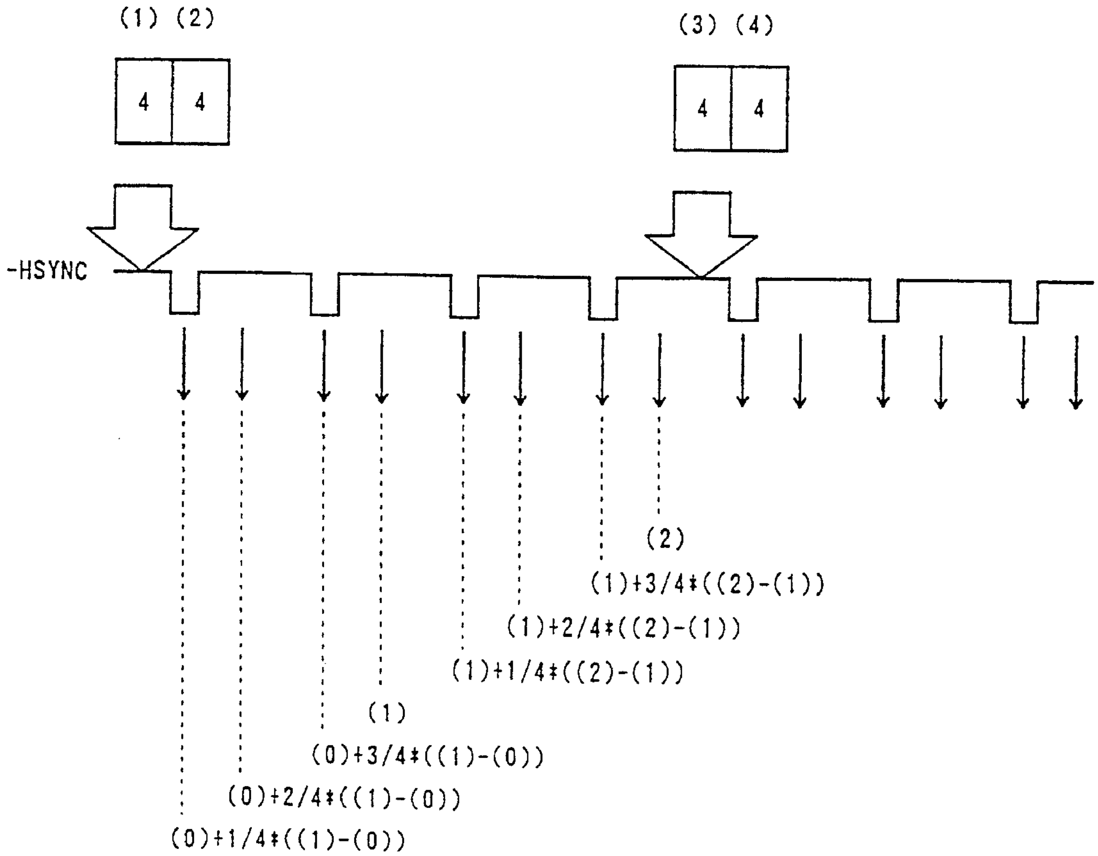
FIG. 5 is a table showing a relation among sampling frequencies, adding amount in data transmission and adding amount in a linear interpolation, according to the invention.
FIG. 6 is an explanatory diagram showing linear interpolation in a 7.87 kHz sampling frequency mode, according to the invention.

FIGS. 5 and 6 show linear interpolation for the case of sampling frequencies other than 31.47 kHz. FIG. 6 is for the sampling frequency of 7.87 kHz, (0), (1), (2), (3) and (4) indicating the order of transmission and "4" in squares indicating that data are transmitted for each byte in four horizontal period (4H). When the sampling frequency is 7.87 kHz, the amount to be added to the current data is one fourth of difference between the previous data and the current data, as shown in FIG. 6. Previous data (0) are reproduced during the rise time of HSYNC immediately after transmitting data (1) and (2). Data given by adding "(d(n)–d(n–i))/4" to the data (0) at each step (½ horizontal synchronizing period) are reproduced in a period between reproduction processing of the data (0) and (1).

Figure 7:
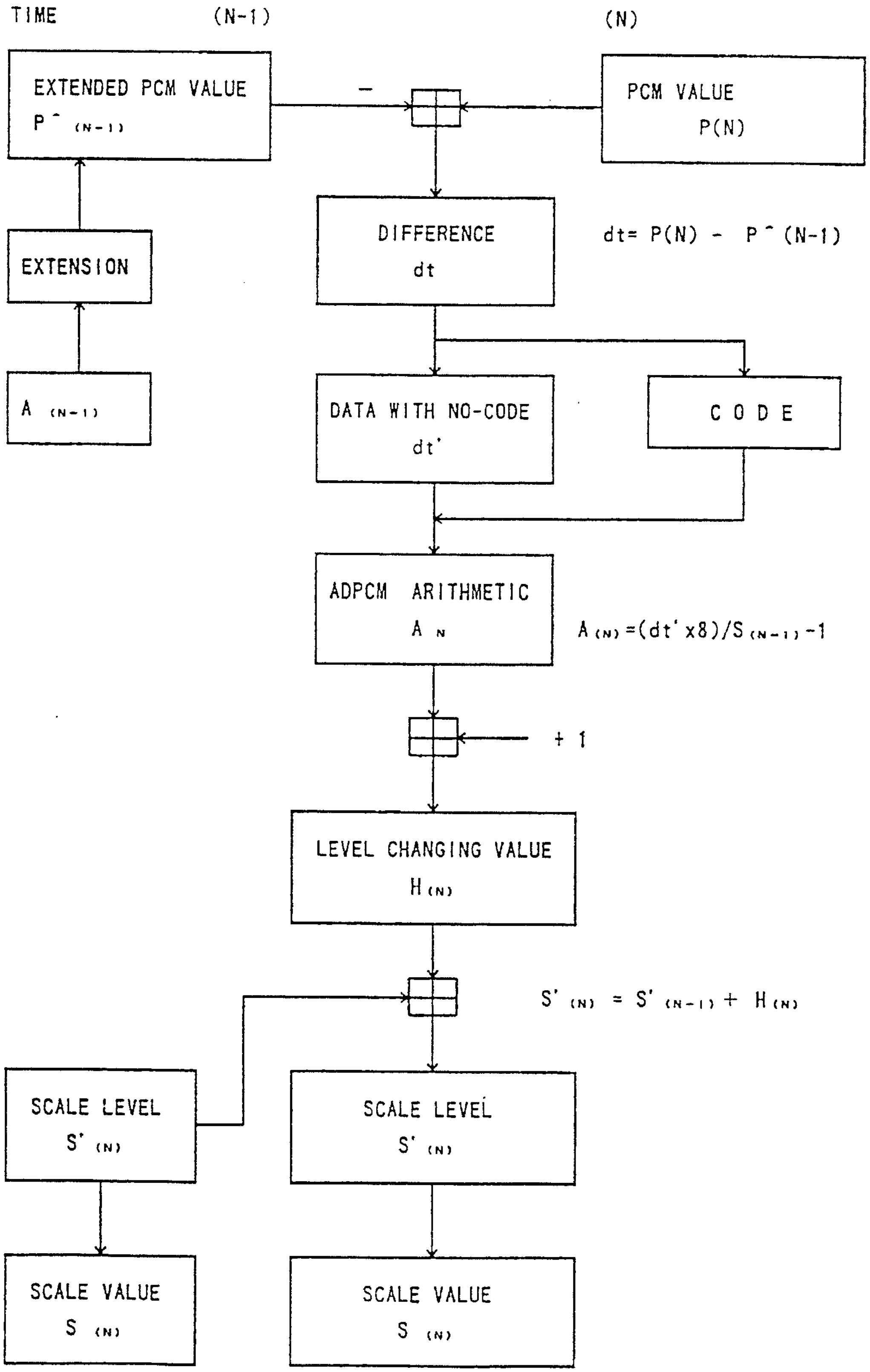
FIG. 7 is a flow chart showing a compressing process for the ADPCM data, according to the invention.
Figure 8:
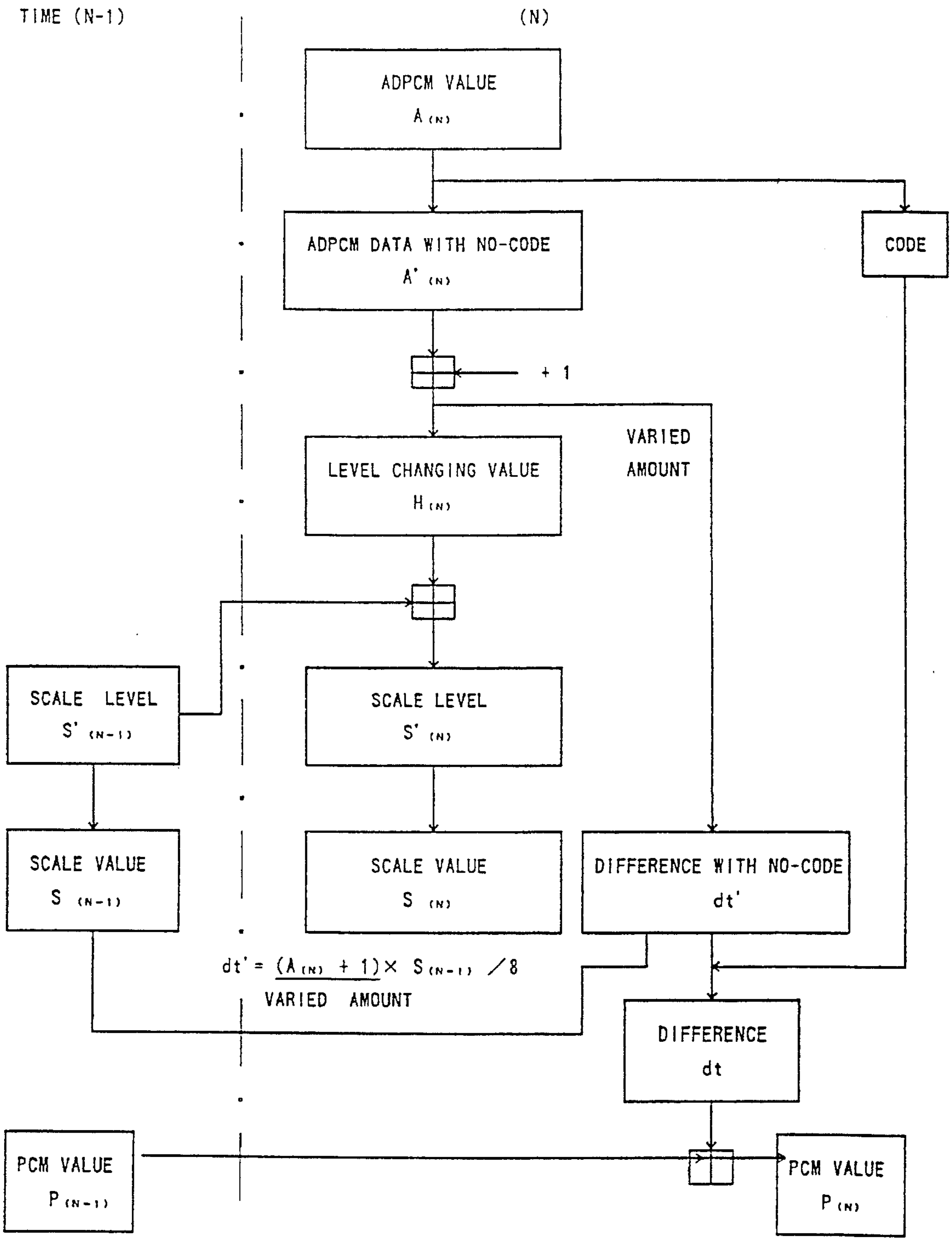
FIG. 8 is a flow chart showing an extending process for reproducing PCM data, according to the invention.

FIGS. 7 and 8 are flow charts showing compression processing of the PCM data to ADPCM data, and extension processing of the ADPCM data to the PCM data by the ADPCM decoders, respectively. In the compression and extension processing, sound data are processed in accordance with two tables shown in FIGS. 9 and 10. FIG. 9 is a correspondence table showing relations among ADPCM data, variations and level changing values. FIG. 10 is a conversion table showing a relation between scale levels and scale values. For the preferred embodiment, an initial scale value is set at the minimum value 16, and the maximum value is set at 48. The maximum and minimum values of the extension data are 4095.875 and 0.

How to compress the PCM data into ADPCM data are now explained. The PCM data are indicated by a "12 bit offset binary code" system. An extended PCM value $P^{\wedge}_{(N-1)}$ at a time N–1 is calculated with three decimal places of significant figures, and the difference between the PCM value and an input value $P^{\wedge}_{(N)}$ at a time N is calculated. ADPCM compression arithmetic is performed in accordance with an equation "$A(N)=dt'\times8/S_{(N-1)}$" with three decimal places, and then the value is rounded to a whole number. The level changing value $H_{(N)}$ is given by referring to the table in FIG. 9. The difference dt' is calculated with some decimal places to obtain the extension data $P^{\wedge}_{(N-1)}$. The ADPCM data is composed of 4 bits including a code bit at the first bit thereof. At the time N, the code bit is removed from the ADPCM data $A_{(N)}$ to form an ADPCM data $A'_{(N)}$, and then +1 is added to ADPCM data $A'_{(N)}$ to form a changing value to be used for the following arithmetic.

The level changing value $H_{(N)}$ is given by referring to the table shown in FIG. 9. The level changing value $H_{(N)}$ is added to a scale level $S_{(N-1)}$ to provide a scale level $S'_{(N)}$ at the time N. A scale level $S_{(N)}$ given from a scale level $S'_{(N-1)}$ by referring to the table, shown in FIG. 5, is held until the difference "dt" is given at a time N+1. A difference dt' $(=(A_{(N)}+1)\times S_{(N-1)}/8)$ with no code is calculated based on a changing value "$A_{(N)}$+1" and the scale value $S_{(N-1)}$ at the time N–1, and then the code bit of the ADPCM data is supplied to the value dt' to provide the difference value "dt". The difference "dt" is added to a PCM value $P_{(N-1)}$ to obtain extension data $P_{(N)}$ at the time N.

In the computer system, sound volume and sampling frequency of the ADPCM decoder, soft-reset, and operation of the PSG are controlled by the CPU using registers.

The registers contained in the ADPCM decoder are now explained in conjunction with FIGS. 11 and 12.

FIG. 11 shows an operation register for specifying operations of the ADPCM decoder. A sampling frequency of the ADPCM decoder is specified using 2 bits of DIV1 and DIV0. In the register, when DIV=0, DIV=1, DIV=2 and DIV=3 are set, the sampling frequency becomes 31.74 kHz, 15.73 kHz, 7.87 kHz and 3.93, respectively. Interpolations #1 and #2 instruct the ADPCM decoders #1 and #2 to perform interpolation, respectively, when these decoder use a sampling frequency other than 31.47 kHz. RSTADPCMs #1 and #2 instruct the ADPCM decoder to perform a soft-reset operation independently with the control unit.

FIG. 12 shows a volume register for specifying sound volume of the ADPCM decoder. Each channel of the ADPCM decoder is controlled in volume at the right and left. When each of the registers D5 to D0 is set at "3F (hexa)," the maximum volume is obtained. One register value corresponds to an attenuation amount of –1.5 dB, and the register value "1C (hexa)" corresponds to the maximum attenuation amount —2.5 dB. When the register value is set at 1B to 00, no sound is obtained.

Figures 13A, 13B, 13C:
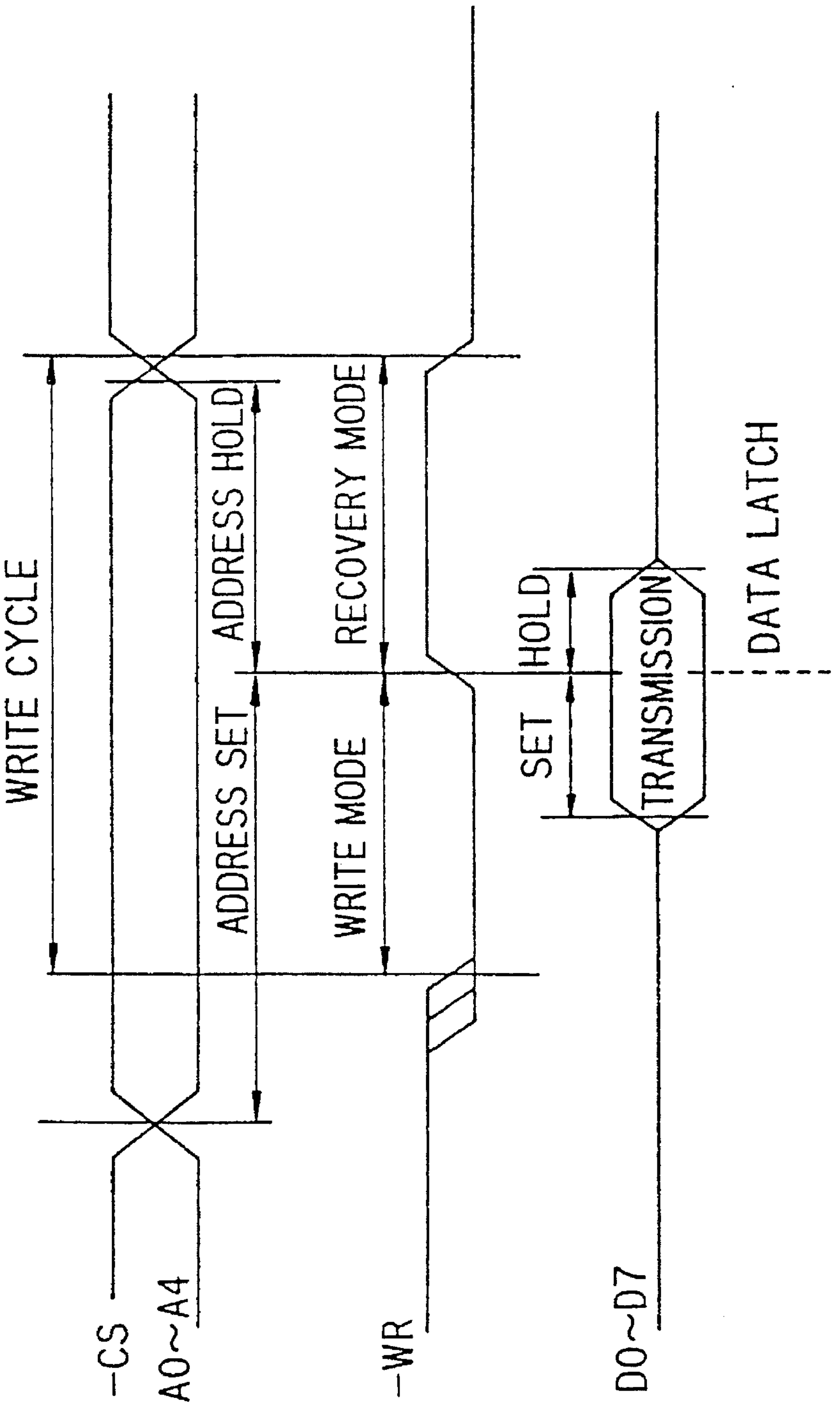
FIGS. 13(*a*)–(*c*) are a timing chart showing operation of the sound data output unit according to the invention.

Operations for writing data by the CPU into the registers, shown in FIGS. 11 and 12, are now explained in conjunction with FIG. 13.

FIG. 13 shows voltage levels at input terminals of the sound data output unit. In this figure, -CS, A0 to A4, -WR and D7 to D0 represent a chip select signal, a write address signal, a write signal and a data input signal, respectively. Input data are supplied from the CPU through the bus of D7 to D0 to the sound data output unit. In a write mode when the write signal -WR is low, data are written through D7 to D0 to the registers specified by the chip select and address signals from the CPU. Each time when the write signal -WR rises to a high level recovery mode (shown by broken line), the data are latched, and then the latched data become effective at the next falling edge of a sampling clock pulse. When data are written more than two times in one sampling period, the following data, which have been written just before the previous data, become effective.

In this embodiment, transmission of sound data stored in the K-RAM is controlled by an ADPCM decoder control register contained in the control unit, the register being set by the CPU.

FIG. 14 shows control registers contained in the control unit for controlling the operation of the ADPCM decoder.

FIG. 14(1) shows a reproduction mode register for holding data that specify a sampling frequency and a start timing for data transmission. In this register, a sampling frequency of the ADPCM decoder is specified using 2 bits of DIV1 and DIV0. In the same manner as the register shown in FIG. 11, when DIV=0, DIV=1, DIV=2 and DIV=3 are set, the sampling frequency becomes 31.74 kHz, 15.73 kHz, 7.87 kHz and 3.93, respectively. Registers READEN #1 and #2 instruct the ADPCM decoders #1 and #2 to reproduce sound data, respectively.

FIG. 14(2) shows a data buffer control register for holding data that specify an interrupt operation and a condition of a memory storing sound data to be transmitted to the ADPCM decoders #1 and #2. Registers RINGBUF #1 and #2 specify the mode of the memory, that is, the memory is used as a ring-buffer (endless memory) when a high level bit is set at the register. In this mode, an addressing operation is performed continuously for continuous transmission of data. On the other hand, the memory is used as a sequential buffer (general memory) when no high level bit is set at the register. In this mode, the memory is reset when the end address is pointed by a read pointer contained in the control unit.

While high level bits are set at registers BUFEND #1 and #2, an interruption is performed when the read pointer points the end address of the memory. While high level bits are set at registers BUFHALF #1 and #2, an interruption is performed when the read pointer points the half address of the memory.

FIG. 14(3) shows a start address register for holding data that specify a start address of data to be read from the memory. Addresses specified by the registers READEN #1 and #2 are loaded in the read pointer to start reading and transmitting sound data. When the memory is used as the ring-buffer, the start address of the register is renewed after the read pointer transmits the end address data.

FIG. 14(4) shows an end address register for holding data that specify an end address of data to be read from the memory. While the memory functions as the sequential buffer, the read pointer stops transmitting data when data at the end address of the register is finished being transmitted, and then the ADPCM reproducing enable regions (READEN #1 and #2) in the ADPCM data buffer control register are reset.

FIG. 14(5) shows a half address register for holding data that specify an address for an interrupt operation. According to the register, read timing of data following the interruption is controlled to realize continuous transmission of ADPCM data.

FIG. 14(6) shows a status register for holding data that specify conditions of the ADPCM. When the read pointer transmits data at the end address of the memory, registers SOUNDEND #1 and #2 are set. When the read pointer transmits data at the half address of the memory, registers SOUNDHALF #1 and #2 are set. This register is reset when the ADPCM reproducing enable is set or the register is finished being read for monitoring the condition of ADPCM.

Figures 15A, 15B, 15C, 15D, 15E:
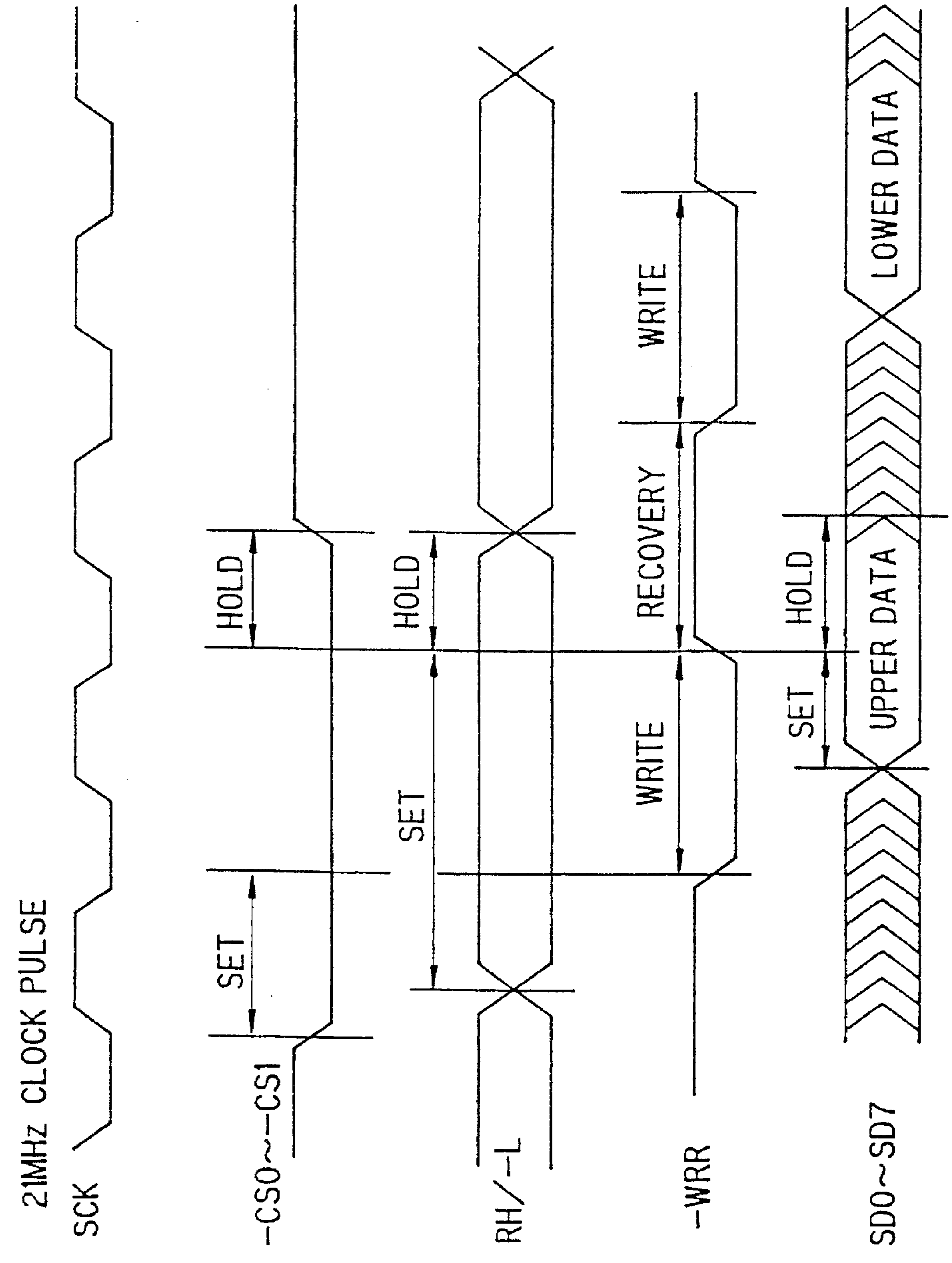
FIGS. 15(*a*)–(*e*) are a timing chart showing operation of the sound data output unit according to the invention.

FIG. 15 shows voltage levels at terminals of the sound data output unit, to which signals are supplied from the control unit. In this figure, -CS0 and -CS1, RH/-L, -WRR and SD0 to SD7 represents terminals for receiving chip select signals, a select signal for selecting upper or lower bytes of read data, a write signal and a data input signal, respectively. One of the ADPCM decoders #1 and #2 is selected to receive data by adjusting levels of the terminals -CS0 and -CS1. The sound data are transmitted in the order of first and second halves in accordance with voltage level of the signal. When the write signal at the terminal -WRR falls, predetermined data are included in the signals to be supplied to the terminals SD0 to SD7.

In this embodiment, sound data transmission and reproduction rates are controlled to be synchronized with horizontal synchronizing signals by the sound control unit (SOUNDTRL) and ADPCM decoder.

Figures 16A, 16B, 16C, 16D, 16E:
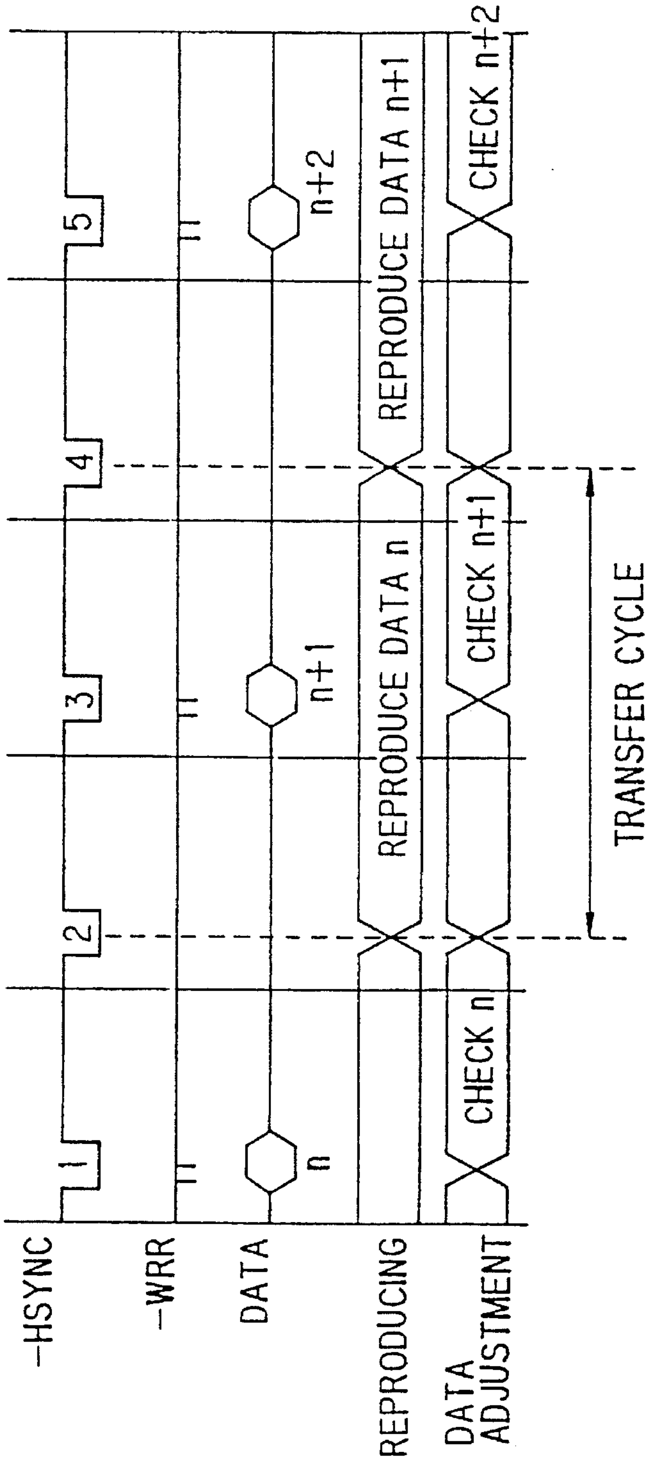
FIGS. 16(*a*)–(*e*) are a timing chart showing operation for transmitting and reproducing sound data, according to the invention.

FIG. 16 shows a timing relation among the horizontal synchronizing signal and data transmission and reproducing cycles, in the case of a sampling frequency of 31.47 kHz. The output control unit transmits the write signal -WRR to the ADPCM decoder in response to a horizontal synchronizing signal HSYNC1, while data n–1 are being reproduced. Data "n" are transmitted for each byte in the order of the last one byte and first one byte in one horizontal flyback period, and the data are latched during the flyback period. In response to a horizontal synchronizing signal HSYNC2, the ADPCM decoder reproduces the data "n". During this reproduction operation, the following data n+1 are transmitted to the decoder in response to a horizontal synchronizing signal HSYNC3.

As described above, according to this embodiment, sound and image data are displayed in synchronization with each other, because the ADPCM decoder reproduces sound data in synchronization with the horizontal synchronizing signal, which has the same cycle as a vertical synchronizing signal used for controlling the image output. The CPU may monitor the operating condition of the horizontal synchronizing signal, according to which a data transmission rate of the ADPCM decoder is determined, and therefore, the CPU may also monitor the sound output condition. According to the invention, it is easy to find the amount of sound data, because the reproduction rate of the ADPCM decoder is controlled in accordance with the horizontal synchronizing signal, and sound data to be reproduced are fixed in size.

Next, halfway reproduction of sound data will be explained. If a reproduction operation stops halfway, the scale level and PCM value in the decoder are initialized to 0 and 200H, respectively. For example, when the scale level and PCM value need to be 4 and 190H to reproduce the sound data again from the middle, the following processes are carried out:

1. A scale value "$S_{(N-1)}=16$" that corresponds to a scale level "$S'_{(N-1)}=0$" is given by referring to the table in FIG. 10.

2. A level changing value "$H_{(N)}=+4$" is given in accordance with an equation "$S'_{(N)}-S'_{(N-1)}=4-0$" and the flow chart shown in FIG. 7.

3. In the table of FIG. 9, when a level changing value $H_{(N)}=+4$, a variation value $(A_{(N)}+1)=6$ and an ADPCM value $A_{(N)}=101$ (binary). In order to change the scale level 0 to 4, the ADPCM value (101) is necessary.

4. A variation value "dt" of the PCM value is given as follows by reproducing the ADPCM value (101) using the changing value $(A_{(N)}+1)=6$ and the scale level $S_{(N-1)}=16$:

$$dt'=dt=(A_{(N)}+1)\times S_{(N-1)}/8=6\times 16/8=12$$

As a result, the PCM value $P_{(N)}$ is given to be $P_{(N)}=P_{(N-1)}+dt$=190H+00CH=19CH.

5. The PCM value changes by 00H to adjust the scale level. The difference between the target and initial values of the PCM value becomes 190H–200H=070, and becomes 070H–00H=064H with consideration of value 00H.

6. In order to adjust the PCM value without changing of the scale level, four ADPCM data 000, 001, 010 and 011 are used. In this embodiment, the ADPCM data 000 is used. The difference dt' which occurs when the data 000 is reproduced once becomes $dt'=(A_{(N)}+1)\times S_{(N-1)}/8=1\times16/8=2$. Therefore, the data is required to be reproduced 50 times, as follows:

REQUIRED ADJUSTING VALUE/DIFFERENCE=064H/2=32H=50

7. The target value is less than the initial value. In order to adjust the scale level and the target value of the PCM, 50 of 1000 (binary) and 1101 (binary) data are used.

These data are calculated in advance to be added to the top of ADPCM data to be reproduced from the middle, and the data are stored in a storage. These data are transmitted through the memory to the sound data output unit by the output control unit. The sound data may be calculated in a subroutine.

As described above, according to the invention, the scale level and PCM value of the ADPCM decoder are adjusted using virtual sound data (pre-calculated data), and therefore, the ADPCM data may be reproduced smoothly from the middle.

FIG. 17 shows a register unit for specifying operating conditions of the PSG. A register at an address R00 specifies a channel to be used from among ch1 to ch6, using the last three bits. The register R00 and an address register specify channel addresses for registers R02 to R09.

The register R01 specifies an amplitude of sound generated by mixing sounds in the channels ch1 to ch6. In this register, output amplitude levels at the left and right sides are adjusted in accordance with LMAL0 to LMAL3 and RMAL0 to RMAL3, respectively. Each of the LMAL and RMAL has the maximum volume when "F (hexa)" set thereat. A value 1 corresponds to an attenuation width of 3 dB.

The registers R02 and R03 specify data for adjusting an output frequency "f OUT" using 12 bit frequency data f, that is, the output frequency "f OUT" is given as follows, where "f MASTER"=7.16 MHz:

$$f\,OUT=f\,MASTER/(2\times32\times f)$$

The register R04 specifies data for controlling output sound for each channel using the first bit. At the second bit, data for controlling a direct D/A mode are held. When "1" is set at the first bit of the register, sound output operation (mixing) for the channel is performed. When "0" is set at the first bit, no output sound is supplied, and data are able to be written into the waveform register R06. When "1" is set at the second bit of the register R04, an address counter of the waveform register R06 is reset, and a data signal is directly supplied to a D/A converter. When "1F (hexa)" is set at the last 5 bits, the maximum volume is obtained. Each register value corresponds to an attenuation width of −3 dB.

The volume register R05 holds data for specifying the volume balance between left and right channels. Each of the LMAL and RMAL has 4 bits, and the maximum volume is provided when "F (hexa)" is set thereat. A value 1 corresponds to an attenuation width of 3 dB.

The register R06 holds waveform data of 32 words (5 bit/word) for each channel, the 32 word data being used for one period waveform data.

The register R07 holds data for specifying whether noise or music is selected to be used and a frequency of a clock signal to be supplied to a noise generator. The noise enable and noise frequency data are held at the first bit and the last five bits, respectively. When "1" is set at the register, no music is generated. In this register, (0)H and (1F)H represent low and high-pitched sounds, respectively.

The register R08 holds data for specifying a frequency of an LFO (Low Frequency Oscillator) for frequency modulation. The registers at the addresses R08, R02 and R03 specify a frequency of the LFO to control an address speed of waveform data of the channel 2.

The register R09 holds data for specifying whether the LFO is set or reset using the first bit, and a modulation degree of the frequency modulation of the LFO using the last two bits. When "1" and "0" are set at the first bit, the LFO is reset and is restarted, respectively.

FIG. 18 shows registers which store data for controlling volume of the PCM data supplied from the CD-ROM. PCMVOLL0 to PCMVOLL5 and PCMVOLR0 to PCMVOLR5 specify amount of attenuation at left and right sides of a VCA (Voltage Controlled Amplifier), respectively. In these registers, (01)H approximately corresponds to 16 steps of attenuation.

FIG. 19 shows the characteristics of the VCA, register values, amplifier and attenuation steps, and adjusting speed. The VCA contained in this system also controls another external VCA.

When an internal VCA is employed in the system and the volume register is rewritten "3F" to "00", the volume level is changed by "20 log (0/1023)=−∞dB", and the necessary time T is given by the following equation:

$$T=1.49\times512+2.98\times256+5.96\times128+11.92\times64+23.84\times32+47.68\times16+2956.16=7.53\text{ ms}$$

When the register is rewritten "3D" to "3F", the volume level is changed by "20 log (1023/991)=0.27 dB", and the necessary time T becomes 47.68 µs=49×(1023−991).

When the internal VCA is used for controlling an external VCA, a control voltage signal is supplied to the external VCA. When an analog ground is applied with 1.0 V and the register is rewritten (3D)H to (3F)H, the control voltage V and the necessary time T are given as follows:

$$V=-1\times1023/991=-1.032\text{ V (analog ground)}$$

$$T=1.49\times(1023-991)=47.68\ \mu s$$

As described above, according to the invention, the ADPCM data, which need a memory capacity larger than other kinds of sound data, are controlled to be transmitted by the output control unit having a processor function, so that the CPU may operate effectively. The sampling frequency for the ADPCM data may be changed easily. For example, when sound data are sampled by a sampling frequency of 32 kHz, the original sound may be reproduced with high quality from the ADPCM data. On the other hand, when the sound data are sampled by a large sampling frequency, clock pulses generated by a device other than a synchronizing signal generating circuit may be used as synchronizing signals for the reproduction. Especially, this system is useful for a game computer.

Figure 20:
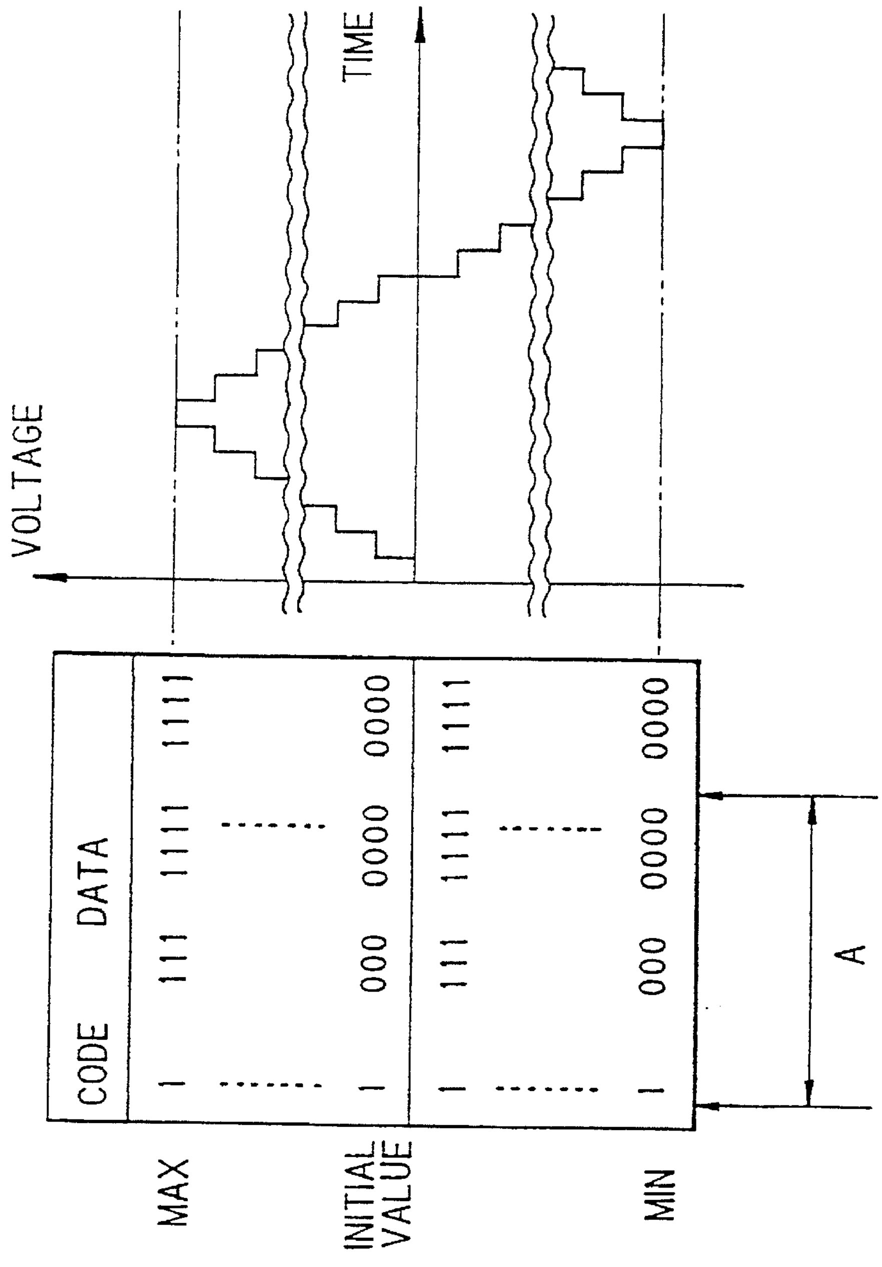
FIG. 20 is an explanatory diagram showing arithmetic operation for calculating a PCM value, according to the invention.

Next, an extending operation of the ADPCM data will be explained in conjunction with FIG. 20. When the system is reset, the PCM value, scale level and scale value become (200)H, 0 and 16, respectively. The PCM data is defined by 12 bits including a code bit at the start. The PCM data are determined to have an initial value of (800)H, a minimum value of (000)H and a maximum value of (FFF)H. The PCM data are calculated by eighteen significant figures with three decimal places in the middle. If a value, which is given by rounding up, has more than 12 bits, the value is treated to be the maximum value (FFF)H. In the PCM value, the first 8 bits of 12 bits become D/A data to be transmitted to a D/A converter, as shown to be a range "A" in this figure.

According to the invention, the PCM data may be reproduced without error, because the ADPCM data are extended by a calculation using rounding. Therefore, high quality sound reproduction may be realized by the system.

Figures 21A, 21B, 21C, 21D, 21E, 21F, 21G, 21H:
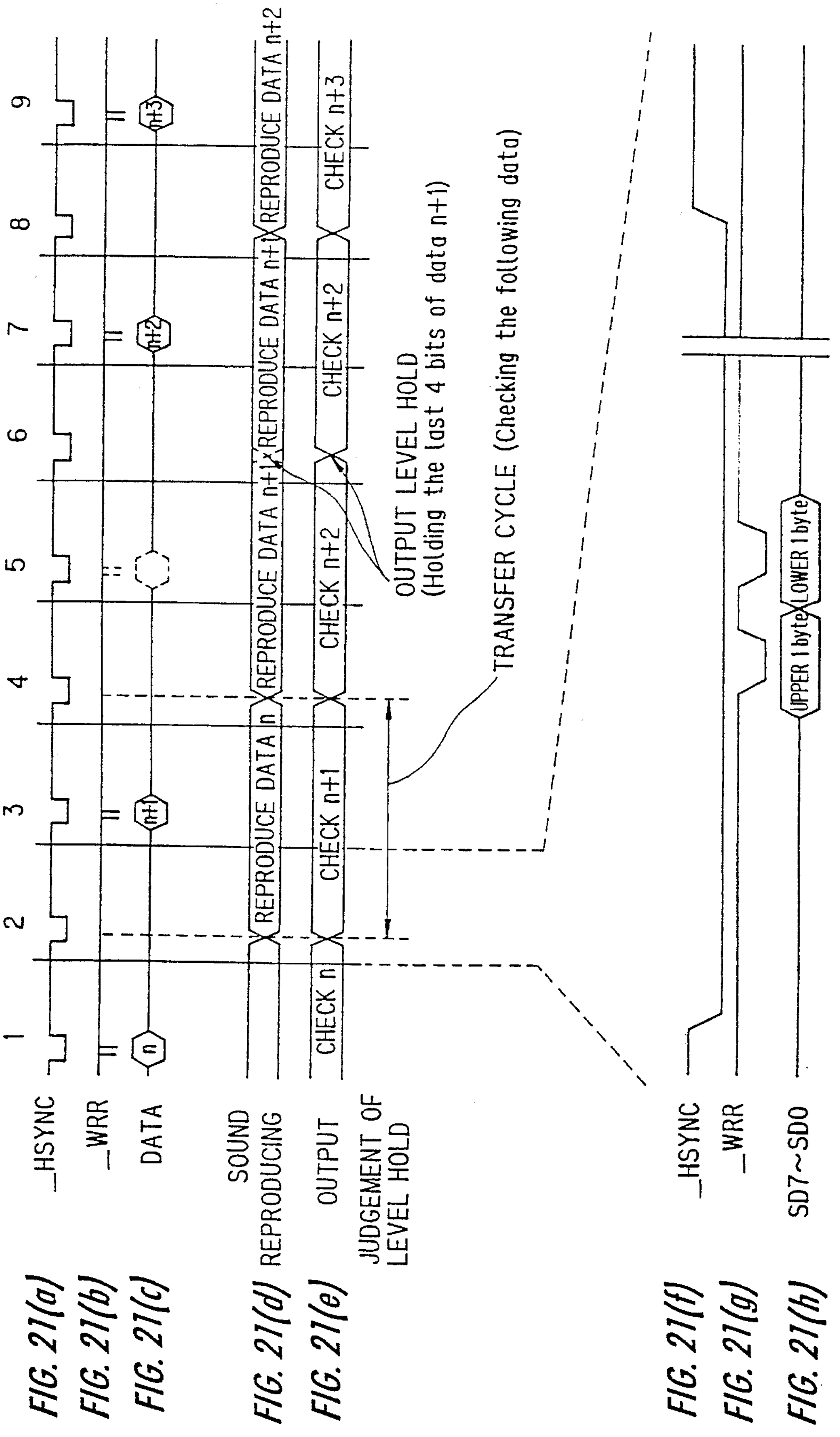
FIGS. 21(*a*)–(*h*) are a timing chart showing operation for transmitting and reproducing sound data, according to the invention.

Next, halfway reproduction operation of sound data will be explained in conjunction with FIGS. 21 and 22. It is assumed that an accident has happened in the middle of the reproducing operation shown in FIG. 16. If an accident has happened after reproduction of data n+1, and the following data n+2 have not been transmitted through 2H (two horizontal) periods, four bits in the first one byte of the data n+1 are held in level. In response to the level holding of bits, a scale level and a PCM value in the ADPCM decoder are not cleared, and a value calculated by extending the data n+1 is held together with a volume adjusting value in the D/A converter. The ADPCM decoder keeps this condition until the data n+2 are transmitted thereto. The ADPCM decoder checks the data n+2, when the data n+2 are transmitted thereto in response to a horizontal synchronizing signal HSYNC7. After that, the ADPCM decoder extends the data n+2 using the scale level and PCM value in response to a horizontal synchronizing signal HSYNC8 to reproduce the PCM data. Immediately before the reproduction, an instruction is supplied to the CPU for setting the register RSTADPCM shown in FIG. 11 high to perform a soft-reset operation of the ADPCM decoder.

FIG. 22 shows holding periods in which output levels of sound data are held. When the sampling frequency is low such as 15.73 kHz and 7.87 kHz, it is judged that data transmission has stopped when no data is transmitted to the ADPCM decoder through 4H and 8H periods, respectively. According to the invention, sound data may be reproduced again from the middle quickly.

Figure 23:
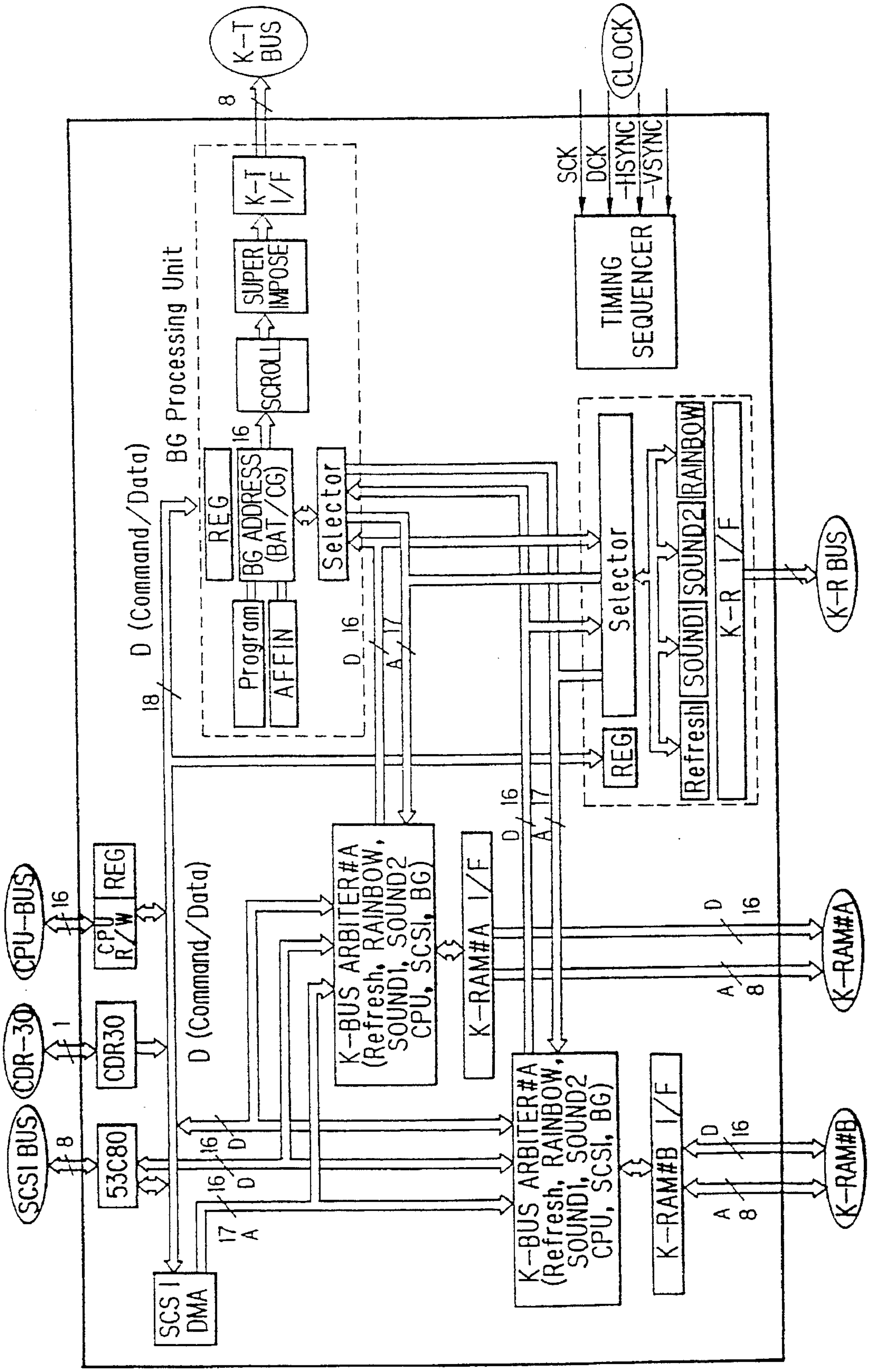
FIG. 23 is a block diagram illustrating a control unit used in the computer system shown in FIG. 2.
Figure 24:
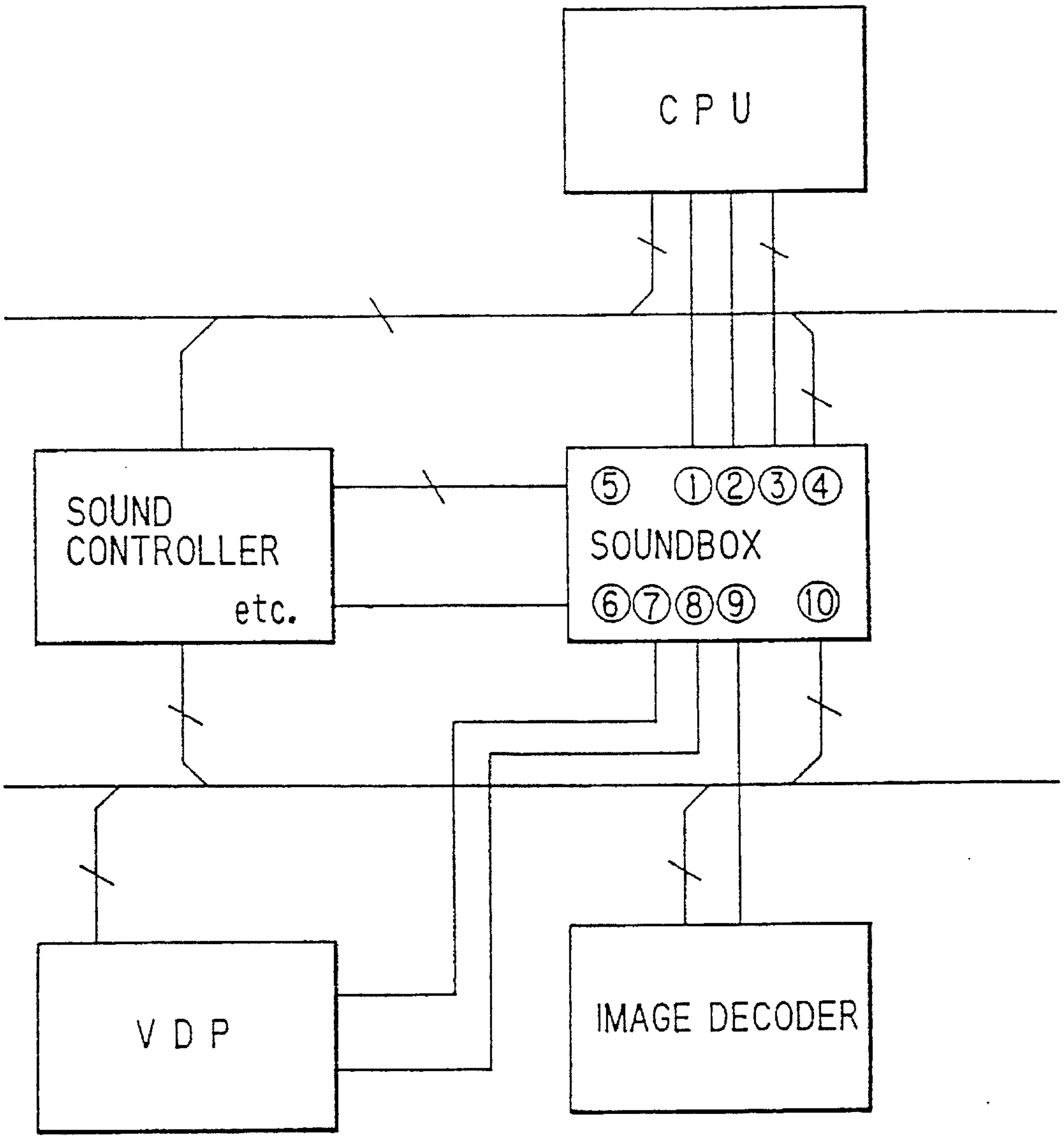
FIG. 24 is a block diagram illustrating the control unit with other devices, according to the invention.

FIG. 23 shows the control unit (sound box chip) containing an SCSI controller, a graphic controller, a sound controller, and the like. This sound box chip functions as PSG, ADPCM, mixer and volume controller.

In this computer system, the sound controller controls sound reproducing of the original sound as follows:

(1) Determining transfer timing in accordance with the HSYNC signal.

(2) Adjusting the length of sound data to be transmitted from the sound controller as being 16 bits.

(3) Determining the amplitude difference of the next two sound signals.

The sound controller transfers sound data in synchronization with HSYNC signal.

The sampling frequencies shown in FIG. 22 may be changed by changing the transfer cycle.

Figure 25:
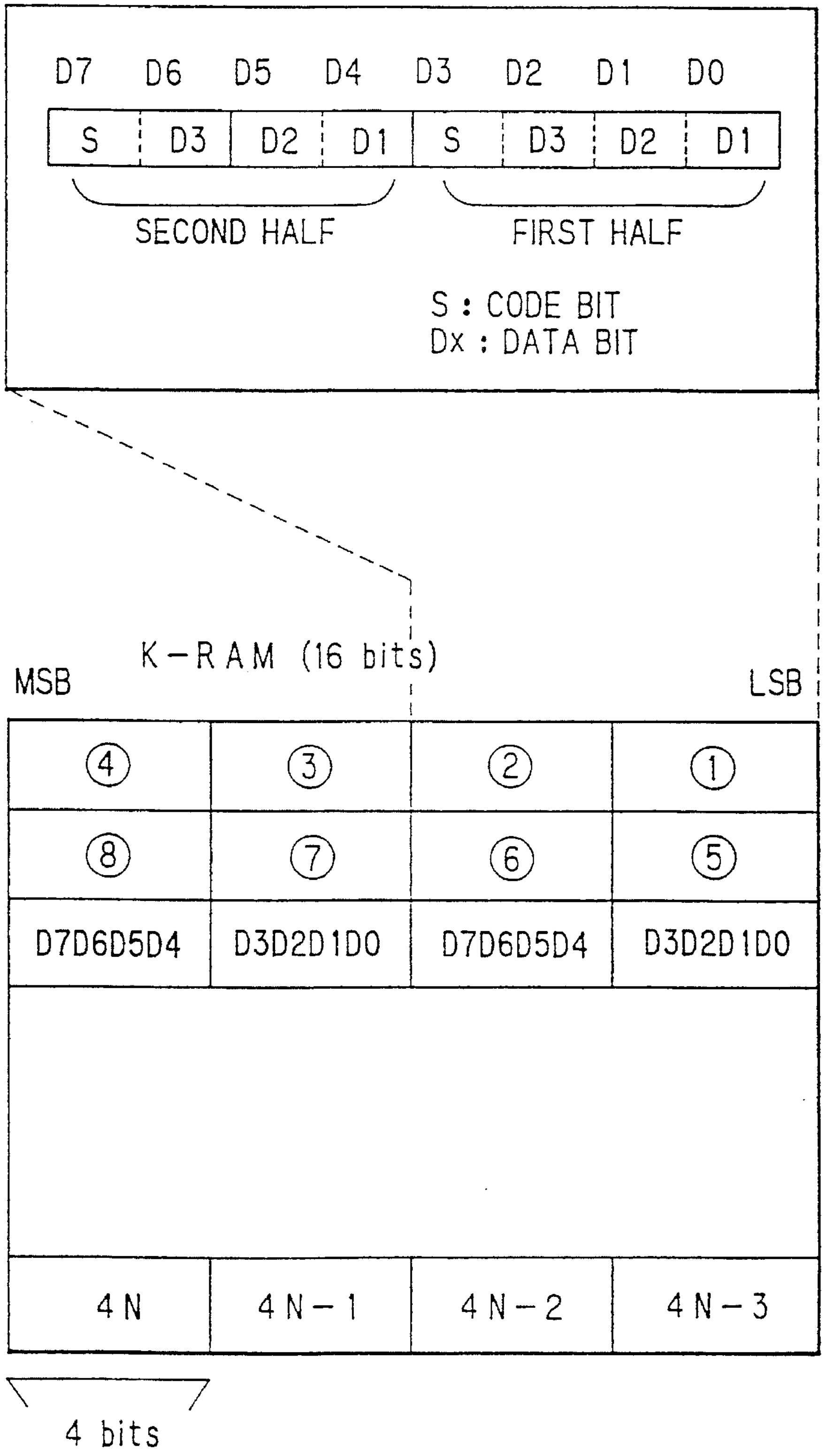
FIG. 25 is an explanatory diagram showing a storage configuration of the ADPCM data in the memory, according to the invention.
Figure 26:
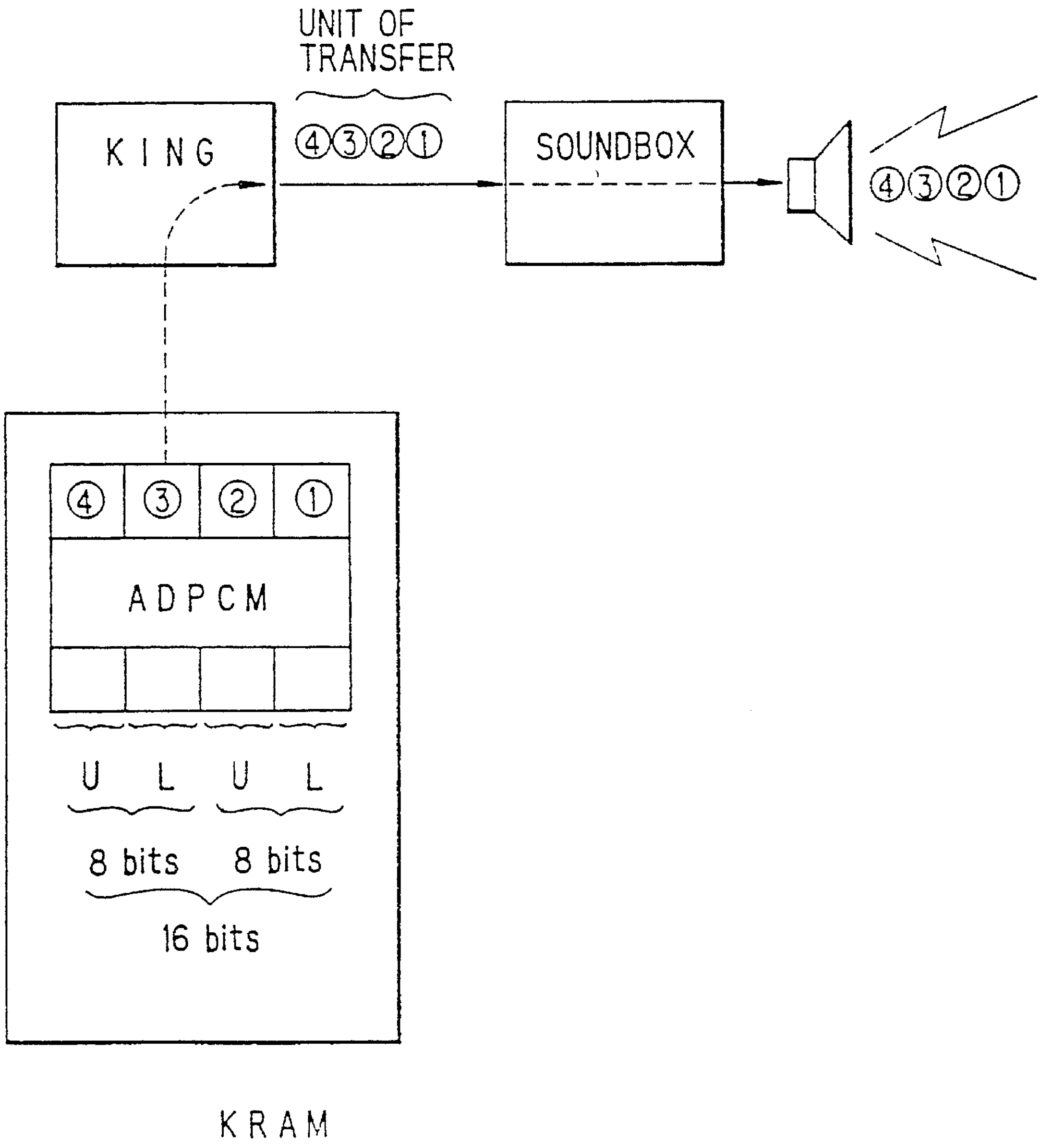
FIG. 26 is an explanatory diagram showing operation for transmitting and reproducing the ADPCM data, according to the invention.
Figure 27:
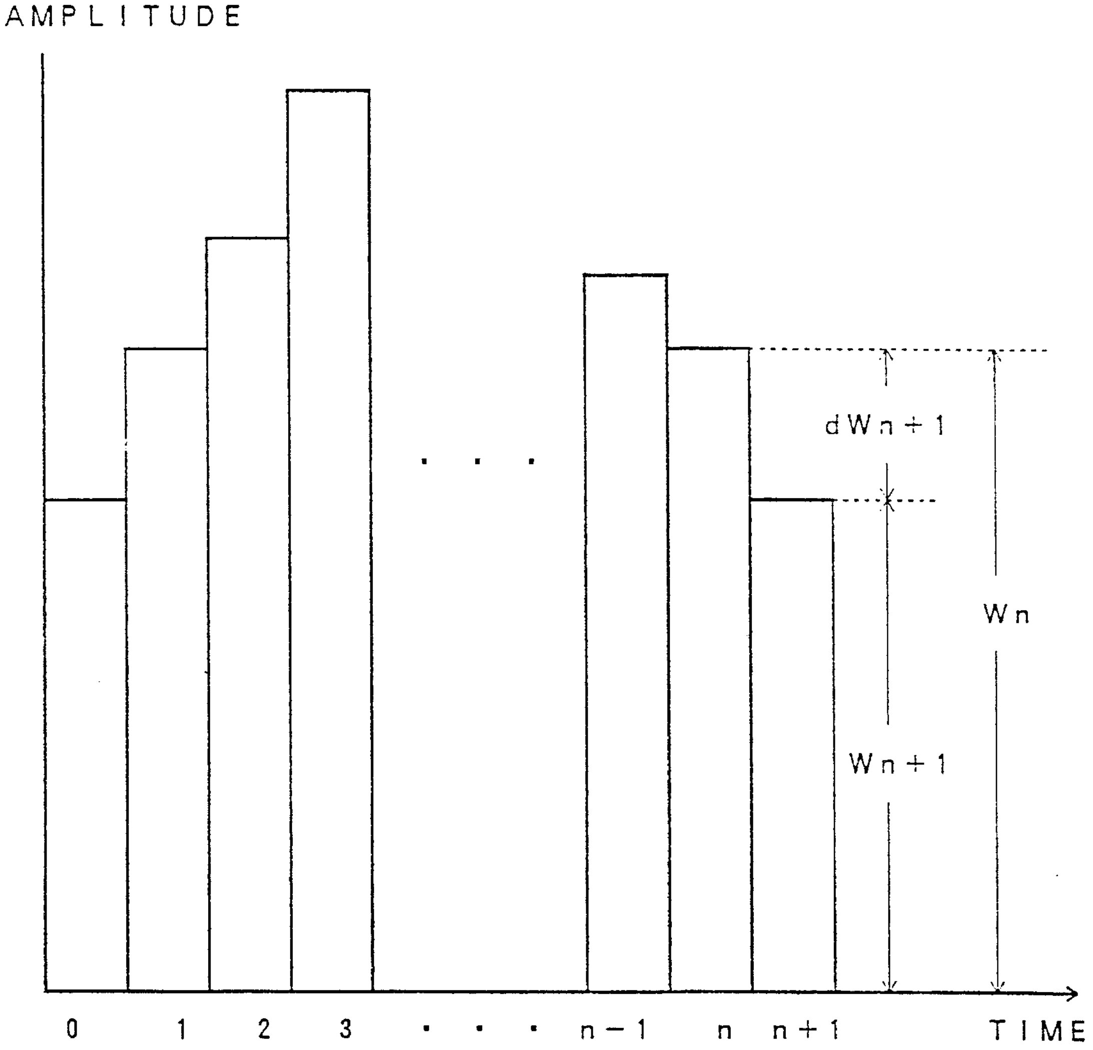
FIG. 27 is a graph showing amplitudes of the sound data, according to the invention.

FIGS. 25 and 26 correspond to FIG. 4, which shows the memory configuration for the ADPCM data in the K-RAM. In the sound box, the upper or lower half of sound data is selected to be processed in accordance with a level at the RH/-L terminal. According to the ADPCM method, when amplitudes of the next two sound signals are $W_n$ and $W_{n+1}$, as shown in FIG. 27, ADPCM data $dW_{n+i}$ are given as follows:

$$dW_{n+1}=W_{n+1}-W_n$$

FIG. 28 shows sound control, sound buffer control, sound buffer start and sound buffer end registers, which are used for reproducing sound stored in the K-RAM to obtain 32 kHz sound. In this case, the channel #1 only is used in a range of "a" to "b," the range corresponding to the addresses in the K-RAM. The sound reproducing operation is carried out by setting the registers as follows:

SOUND CONTROL REGISTER

DIV0=0

DIV1=0

READ EN#1=1

READ EN#2=0

SOUND BUFFER CONTROL REGISTER #1

RING BUF#1=1

BUF END#1=0

BUF HALF#1=0

SOUND START ADDRESS REGISTER #1

KA16–KA8 (START ADDRESS)=a

Lower 8 bits (KA0 to KA7) are fixed to be 00H

SOUND END ADDRESS REGISTER #1

KA16–KA0 (END ADDRESS)=b

ADPCM#1 RESET-SAMPLING FREQUENCY CHANGING REGISTER

DIV0=0

DIV1=0

INTP#1=0

INTP#2=0

RST ADPCM#1=0

RST ADPCM#2=0

In these registers, "#1" added to the register number represents the channel 1. The control register is set at READ EN#2=0, so that the channel 2 is not used. In accordance with "RING BUF#1" in the sound buffer control register #1, a ring buffer (endless buffer) mode is instructed to repeat reproducing the same sound. When "BUF END#1=0" is set at the sound buffer control register, no interruption operating is carried out at the end address. As described above, sound data stored in the K-RAM is reproduced easily by setting the registers.

According to the invention, the sampling frequency may be changed only by changing the values DIV0 and DIV1 of the sound control and ADPCM reset-sampling frequency changing registers. In this system, sound data are transmitted from the K-RAM to sound box for each 16 bits (8 bits×2), and the data size corresponds to each size of memory accessing and bus transmission.

We claim:

1. A computer system for processing sound data comprising:

- a generator for generating ADPCM (Adaptive Difference Pulse Code Modulation) sound data, said generator having a register;
- an ADPCM decoder for reproducing original sound from said ADPCM sound data, said ADPCM decoder having register;
- means for storing the same data in the registers of said generator and said ADPCM decoder to specify a predetermined sampling frequency; and
- a control unit for synchronizing the operations of said generator and said ADPCM decoder with each other in correspondence with said predetermined sampling frequency.

* * * * *